(12) United States Patent
Parghi et al.

(10) Patent No.: US 6,396,495 B1
(45) Date of Patent: May 28, 2002

(54) PRODUCING IMAGE DATA IN A VIRTUAL SET

(75) Inventors: Amit G. Parghi; Jean-Luc Dery, both of Montreal (CA)

(73) Assignee: Discreet Logic Inc., Quebec (CA)

(*) Notice: Subject to any disclaimer, the term of this patent is extended or adjusted under 35 U.S.C. 154(b) by 0 days.

(21) Appl. No.: 09/283,918

(22) Filed: Apr. 1, 1999

(30) Foreign Application Priority Data

Apr. 2, 1998 (GB) ............................................... 9807098

(51) Int. Cl.$^7$ ............................................... G06T 15/00
(52) U.S. Cl. ............................................... 345/426
(58) Field of Search ............................... 345/430, 426, 345/441, 435, 419, 428, 427

(56) References Cited

U.S. PATENT DOCUMENTS

| 5,436,672 A | 7/1995 | Medioni et al. | 348/519 |
| 5,479,597 A | 12/1995 | Fellous | 395/154 |
| 5,949,433 A | 9/1999 | Klotz | 345/435 |
| 5,973,733 A | 10/1999 | Gove | 348/208 |
| 6,088,040 A | * 7/2000 | Oda et al. | 345/441 |
| 6,100,925 A | 8/2000 | Rosser et al. | 348/169 |
| 6,133,943 A | 10/2000 | Nedham | 348/37 |

FOREIGN PATENT DOCUMENTS

| GB | 2312125 A | 10/1997 |
| WO | WO 95/30313 | 11/1995 |
| WO | WO 97/28654 | 8/1997 |

* cited by examiner

Primary Examiner—Phu K. Nguyen
(74) Attorney, Agent, or Firm—Gates & Cooper LLP

(57) ABSTRACT

A virtual set combines real and synthesized images. The set includes a real light source (205) configured to generate a beam of light. In addition, a virtual light source is synthesized such that the real light source and the virtual light source are co-ordinated so as to appear as if originating from a common light source in the virtual set. In this way, a single light source appears to illuminate both a real and a syntheized image.

46 Claims, 31 Drawing Sheets

702

```
PLANEBEGIN
7101    -0.6746  0.0557  -3.8372
7102    -1.2495  0.056   -2.37
7103     1.4305  0.0571  -1.5249
7104     1.3593  0.061   -3.4074
PLANEEND
WH
0        5
```

703

```
PLANEBEGIN
7201     2.412   1.8382  -4.6495
7202     2.4147  1.0387  -4.5260
7203     2.4443  1.1424  -3.3388
7214     2.4658  0.8697  -2.4977
7215     2.4672  1.8544  -2.4173
7216     2.4420  1.7114  -3.4728
PLANEEND
WH
4        4
```

704

```
PLANEBEGIN
7301    -1.2673  1.7752  -4.8105
7302    -1.3321  1.0361  -4.8081
7303     0.064   0.8849  -4.8399
7304     1.992   1.0342  -4.8881
7305     1.8026  1.961   -4.8828
7306     0.117   1.73    -4.8396
7307     0.0     1.4399  -4.838
PLANEEND
WH
4        4
```

$ax + by + cz + d = 0$; where $a = y2.z3 - y2.z1 - y1.z3 + y1.z1 - z2.y3 + z2.y1 + z1.y3 - z1.y1$ $b = z2.x3 - z2.x1 - z1.x3 + z1.x1 - x2.z3 + x2.z1 + x1.z3 - x1.z1$ $c = x2.y3 - x2.y1 - x1.y3 + x1.y1 - y2.x3 + y2.x1 + y1.x3 - y1.x1$ $d = -(x1.a + y1.b + z1.c)$

*Figure 10*

$$\begin{bmatrix} 1 & 0 & 0 & 0 \\ 0 & 1 & 0 & 0 \\ 0 & 0 & 1 & 0 \\ 0 & 0 & 0 & 1 \end{bmatrix} \sim 1301$$
= IDENTITY MATRIX mI $$\begin{bmatrix} 1 & 0 & 0 & 0 \\ 0 & \cos AX & -\sin AX & 0 \\ 0 & \sin AX & \cos AX & 0 \\ 0 & 0 & 0 & 1 \end{bmatrix} \sim 1302$$
= X ROTATION MATRIX mRx $$\begin{bmatrix} \cos AZ & -\sin AZ & 0 & 0 \\ \sin AZ & \cos AZ & 0 & 0 \\ 0 & 0 & 1 & 0 \\ 0 & 0 & 0 & 1 \end{bmatrix} \sim 1303$$
= Z ROTATION MATRIX mRz

*Figure 13*

REGISTRATION MATRIX mR = mI × mRx × mRz + TRANSLATION $$mR = \begin{bmatrix} \cdots & \cdots & \cdots & T_X \\ \cdots & \cdots & \cdots & T_Y \\ \cdots & \cdots & \cdots & T_Z \\ \cdots & \cdots & \cdots & 1 \end{bmatrix}$$

*Figure 14*

Registration File - ASCII matrix DEFAULT     {

```
NAME    "SampleScene"
DESCRIPTION    "Sample Scene"

LIGHTMODEL    {
                  .
                  .
              }

BACKGROUND {
                  .
                  .
           }

OBJECT  }
        NAME    "FLOOR"
        ID 229
        TYPE
        ANIMATABLE   YES
        HIDDEN  NO
```

*Figure 16*

PRODUCING IMAGE DATA IN A VIRTUAL SET

FIELD OF THE INVENTION

The present invention relates to producing image data in a virtual set in which real image data is combined with synthesised virtual image data.

INTRODUCTION TO THE INVENTION

Procedures are known for generating three dimensional representations of objects and spaces and it is known for such representations to be used in many technical and artistic applications. With increasing processor power, it is possible to generate image data frames at broadcast video rate with increasing spatial definition. This allows a synthesised environment to be created which increasingly approaches the realism of a real environment and the overall process has become known as "virtual reality".

In addition to virtual reality applications, in which only a virtual world is seen, a process of combining real images with virtual or synthesised images, to produce a composite output, is disclosed in U.S. Pat. No. 5,479,597, assigned to the present applicant. In a virtual set, talent interacts with a synthesised background in real time and an environment of this type is licensed by the present applicant under the Trade Mark "VAPOUR".

An advantage of virtual sets is that large working environments may be perceived while talent is actually working within a relatively small studio. Furthermore, the number of applications for virtual sets increases as the reality of the virtual world, and hence the illusion of the combined result, is improved.

A problem with improving the reality of a virtual environment is that real environments have lighting effects due to the presence of real direct light sources. A real direct light source will illuminate real objects within a virtual set but it is not possible for such a light source to have similar effects upon virtual objects. Furthermore, great care must be taken when using direct light sources within a virtual set, given that the direct light may change the perceived colour of blue screen backgrounds resulting in the artefact known as "spill".

SUMMARY OF THE INVENTION

According to a first aspect of the present invention, there is provided a virtual set in which real image data is combined with synthesised image data, including a real camera configured to generate said real image data; a real light source configured to direct light towards real entities within the set; synthesising means configured to synthesis virtual image data; combining means configured to combine said real data with said synthesised data; and co-ordinating means configured to co-ordinate said real light source with said synthesised light source so that real light and said synthesised light appear as if originating from substantially the same light source.

In a preferred embodiment, the set includes means for calibrating position transducers for said real light sources. Preferably, the calibrating means are calibrated by directing the real light sources at target position on virtual set walls. Alternatively, the position transducer calibrating means may be calibrated by directing the real light source at known planar surfaces in a virtual set, including means for analysing the shape of the resulting ellipses.

According to a second aspect of the present invention, there is provided a method of producing image data in a virtual set, in which real image data is combined with synthesised virtual image data, comprising the steps of lighting a real object by means of a real light source; synthesising the presence of a light source in said virtual image data; and co-ordinating said real light source with said virtual light source such that said real light and said virtual light appear as originating from a substantially common light source.

BRIEF DESCRIPTION OF THE DRAWINGS

FIG. 7 illustrates registration data of the type generated using the procedures identified in FIG. 6.

FIG. 10 shows definitions for plane equations identified in FIG. 9;

FIG. 13 details the calculation of a registration matrix by matrix concatenation;

FIG. 14 illustrates matrix manipulations, resulting in the production of a registration matrix;

FIG. 15 illustrates an example of a registration matrix stored as an ASCI file;

FIG. 16 illustrates the nature of a file for representing the seen tree information illustrated in FIG. 5;

DETAILED DESCRIPTION OF THE PREFERRED EMBODIMENTS

A virtual studio or virtual set is described in British Patent Publication GB 2 312 125 in the name of the present applicant. The virtual set described in this reference combines images from a virtual world space with real images derived from a real set, in which the system produces output images interactively and in real time.

Figure 1:
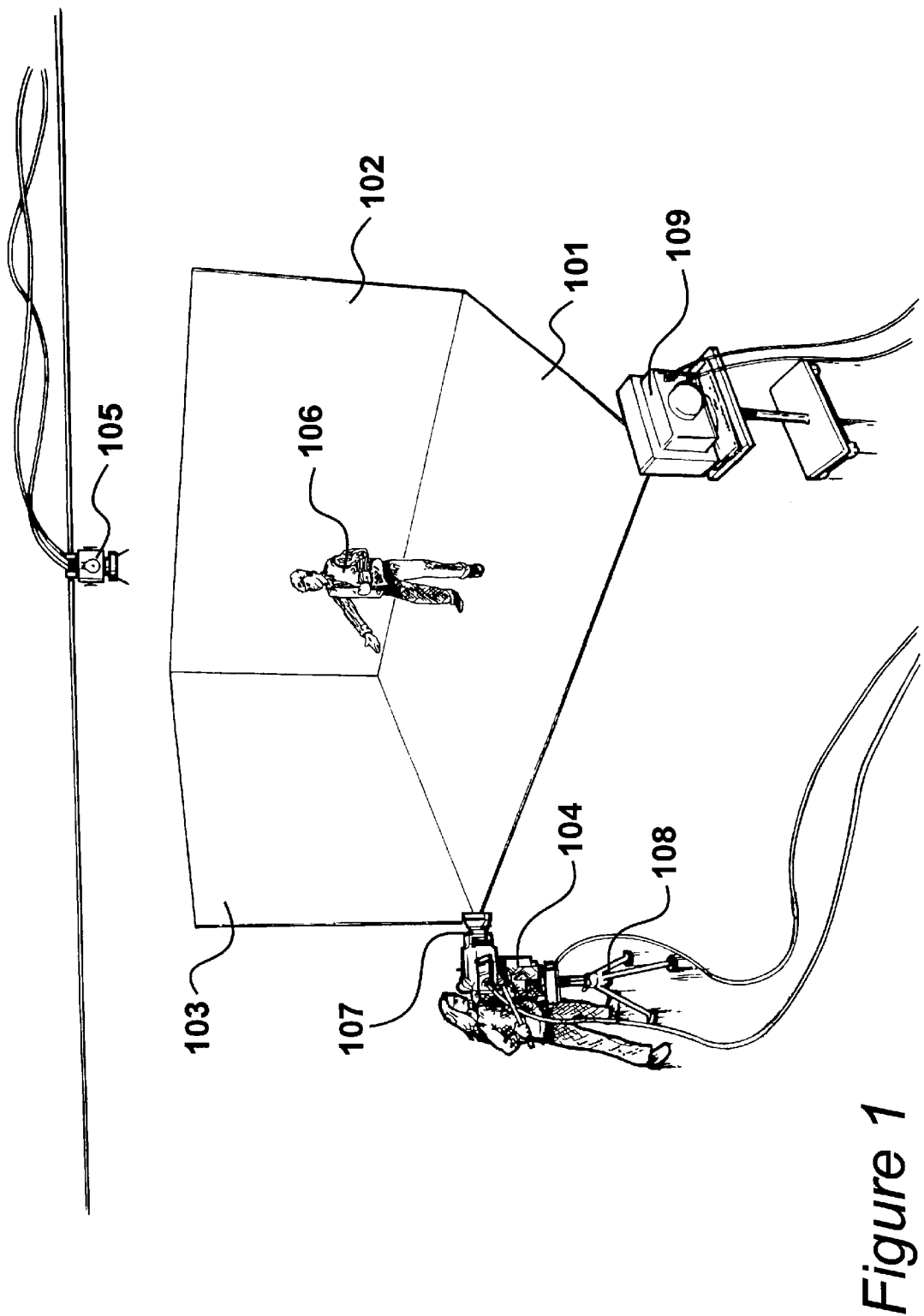
FIG. 1 shows a virtual set in which television pictures are generated in response to talent placed before a chroma-keyable screen allowing virtual or synthesised images to be combined.

A virtual set in which television pictures are generated in response to talent placed before a chroma-keyable screen is illustrated in FIG. 1. The virtual set includes a floor 101, a first wall 102 and a second wall 103, all presenting a saturated blue colour to a camera 104. The floor and wall shown in FIG. 1 join at edges and at a corner but in a preferred virtual set these discontinuities are actually rounded so as to present a substantially continuous surface to the camera 104. The set also includes a direct light source 105 allowing a spotlight to be directed on talent 106 or upon other areas within the virtual set.

Television camera 104 is fitted with a zoom lens 107 and the camera is rotatably mounted to allow panning and tilting upon a fixed tripod 108. The camera also includes sensors configured to generate signals defining the actual pan, rotation, tilt and zoom properties of the camera to generate positional data which is supplied to a processing system shown in FIG. 2. The processing system produces output signals representing the combined real and synthesised images and these signals are supplied to a broadcast monitor 109, providing feedback to talent 106 to facilitate more accurate interactions.

Virtual images are generated at video rate and require a relatively high definition in order to produce realistic results. Consequently, substantial processing hardware is required and in the present embodiment the process is configured to operate on an Onyx2™ processing system 201 manufactured by Silicon Graphics Inc. High definition virtual images generated by processing system 201 are supplied to monitor 109 and to a local monitor 202, in addition to being supplied to an output video feed. The processing system 201 is controlled by an operator by means of a video display unit 203, a keyboard 204 and a mouse 205. Machine-readable instructions executable by processing system 201 are supplied to said system by means of a CD ROM 206 readable by means of a CD ROM reader 207.

Figure 2:
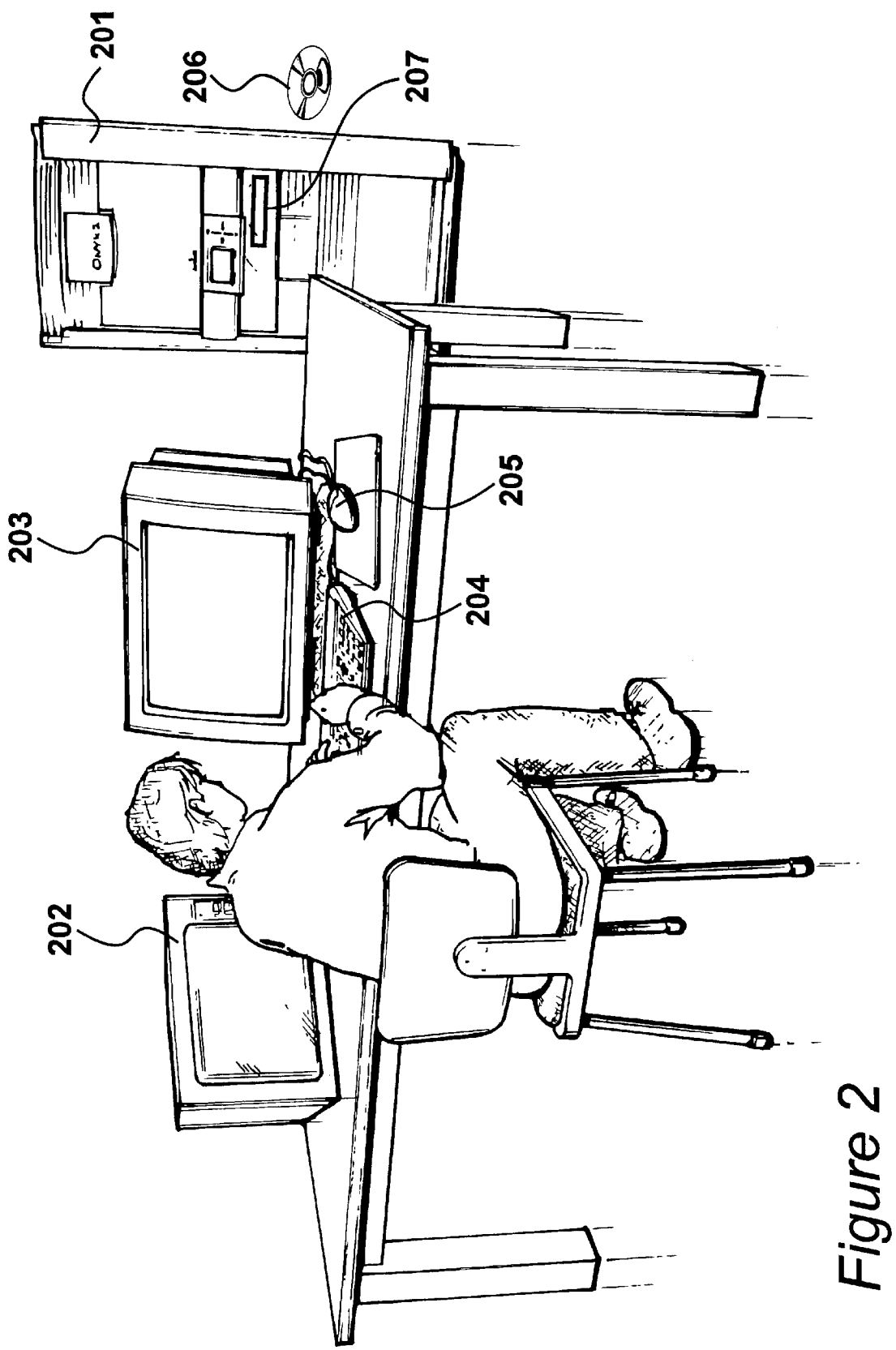
FIG. 2 illustrates a station for generating virtual images and for combining images derived from the real studio shown in FIG. 1 with virtual images, including a visual display unit and a data processing system.
Figure 3:
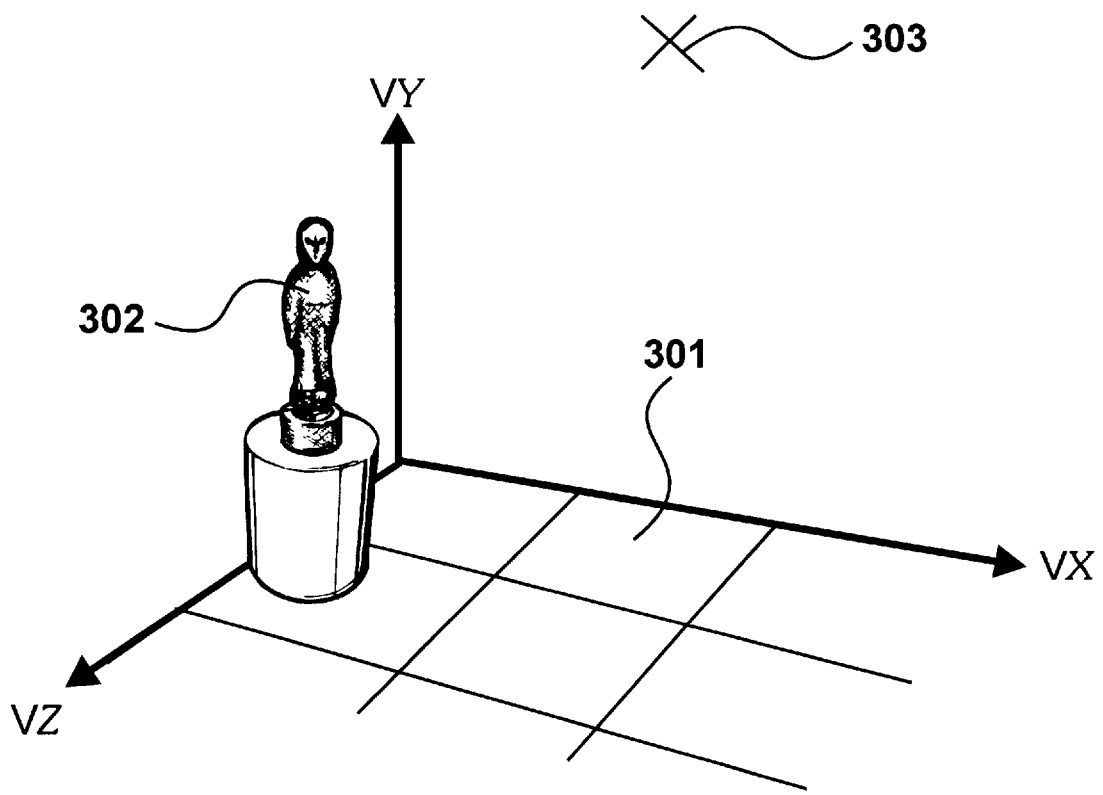
FIG. 3 shows an example of a virtual image generated by the system shown in FIG. 2.

An example of a virtual image generated by the system shown in FIG. 2 is illustrated in FIG. 3. A virtual world space is defined in terms of its own co-ordinate set of axes VX, VY and VZ. A floor 301 is defined in the virtual world and, through a registration process, this floor is aligned with floor 101 of the real virtual set shown in FIG. 1. An object has been defined, in terms of a plurality of three dimensional polygons, which are rendered to produce a two dimensional image.

Figure 4:
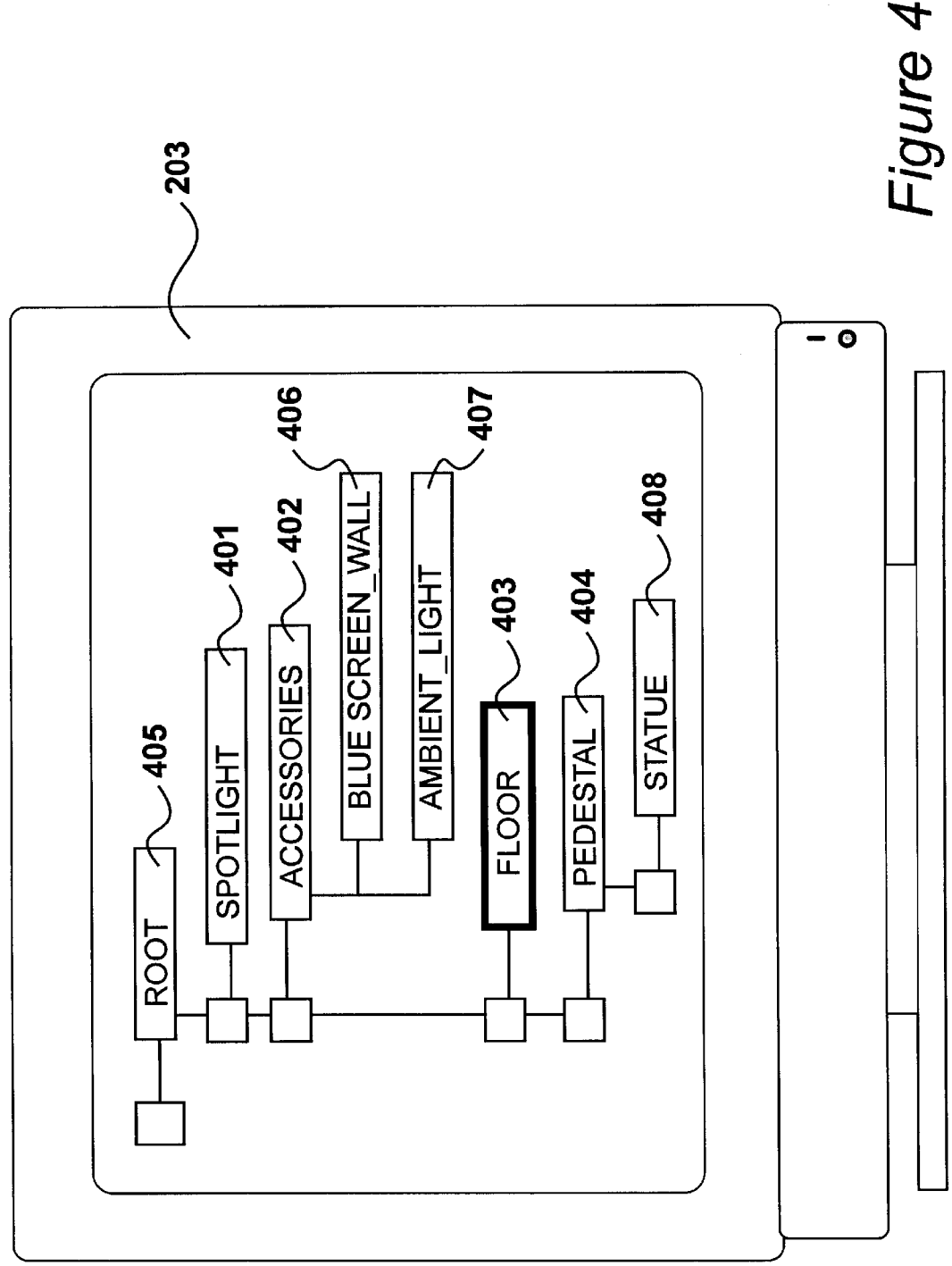
FIG. 4 shows a combined output image, produced when the talent shown in FIG. 1 is combined with the virtual image shown in FIG. 3.

The polygons are defined in a tree structure to facilitate interactions between component parts of the object, as shown in FIG. 4. A spotlight object 401, an accessories object 402. A floor object 403 and a pedestal object 404 extend from a root node object 405. The accessories object 402 is itself constructed from a blue screen wall object 406 and an ambient light object 407. Similarly, a statue object 408 extends from the pedestal object 404. Objects higher up the tree structure take priority over objects lower down the tree structure in order to determine a rendering order, ensuring that background objects are occluded by foreground objects.

Object 302 is rendered by assuming an ambient lighting condition. In addition, object 302 is also illuminated by a virtual direct light source, synthesising the effect of a spotlight in the virtual three dimensional world.

Figure 5:
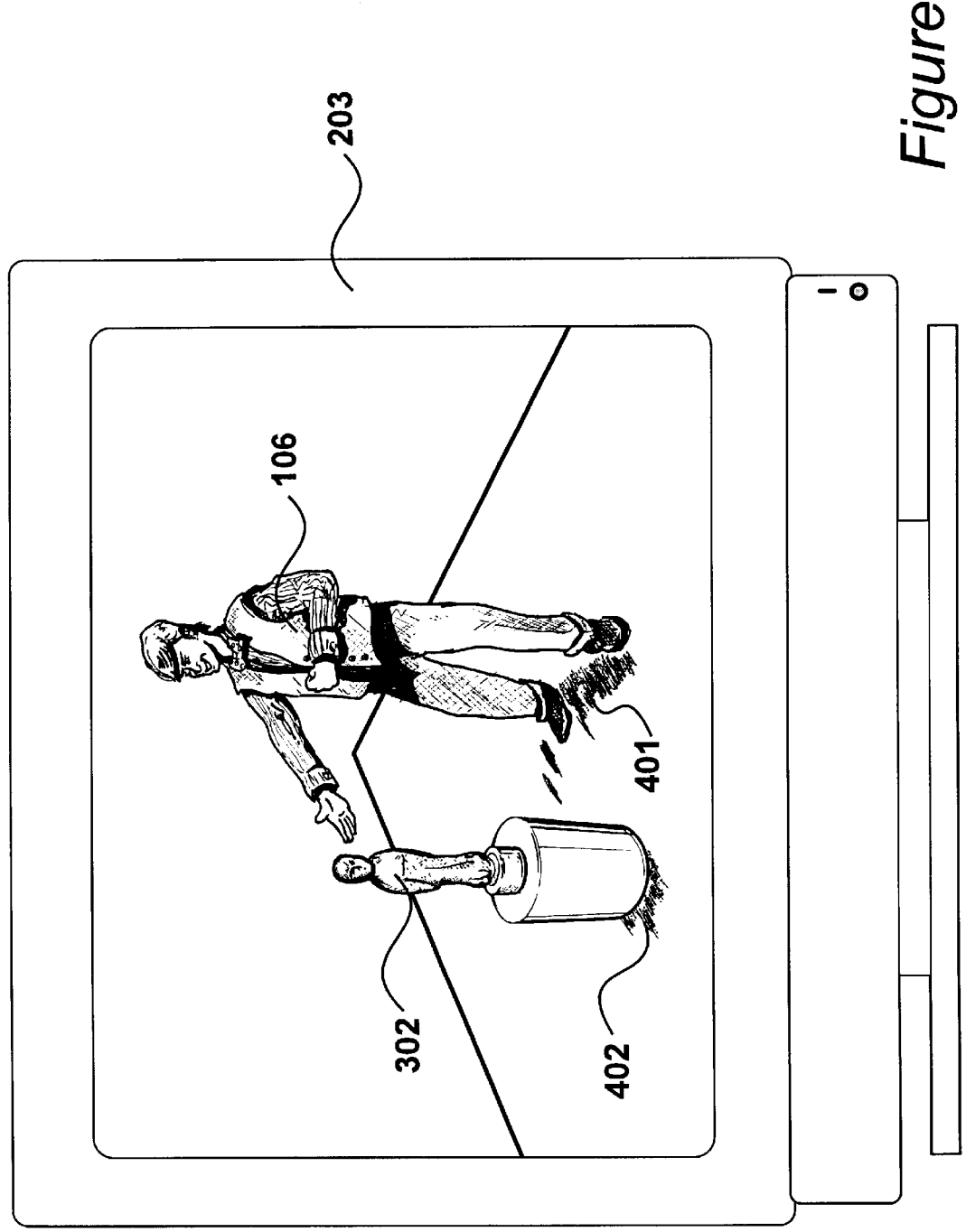
FIG. 5 shows procedures for constructing and operating the virtual set environment shown in FIGS. 1 and 2, including procedures for generating virtual set registration data; procedures for calibrating light sources and procedures for producing output image data.

The output video data, including the real and virtual components, is displayed on the visual display unit 203, as shown in FIG. 5. The image is generated from image data derived from a virtual set, including real image data, represented by talent 106 and synthesised virtual image data represented by object 302. The real object 106 is lit by means of a direct light source 105 which results in the casting of shadows 401. The light source 105 is at a position such that object 302 would also cast a shadow if this were a real object in the real world. However, given that object 302 does not exist in the real set it is not possible for the object to cast a shadow due to the presence of real light source 105.

In the virtual world space, object 302 casts a shadow 402 due to the presence of a virtual light source. Thus, a direct light source is synthesised in the virtual world space resulting in lighting effects being created due to the presence of objects in the virtual world space. Similarly, given the position of virtual light source 303, lighting effects should be created due to the presence of talent 106. However, given that talent 106 is not present in the virtual world space, it is not possible for shadows or similar lighting effects to be generated due to the presence of the virtual light source. However, in accordance with the present invention, the real light source 105 and the synthesised light source 303 are co-ordinated such that the real light and the virtual light appear as originating from a substantially common light source.

Figure 6:
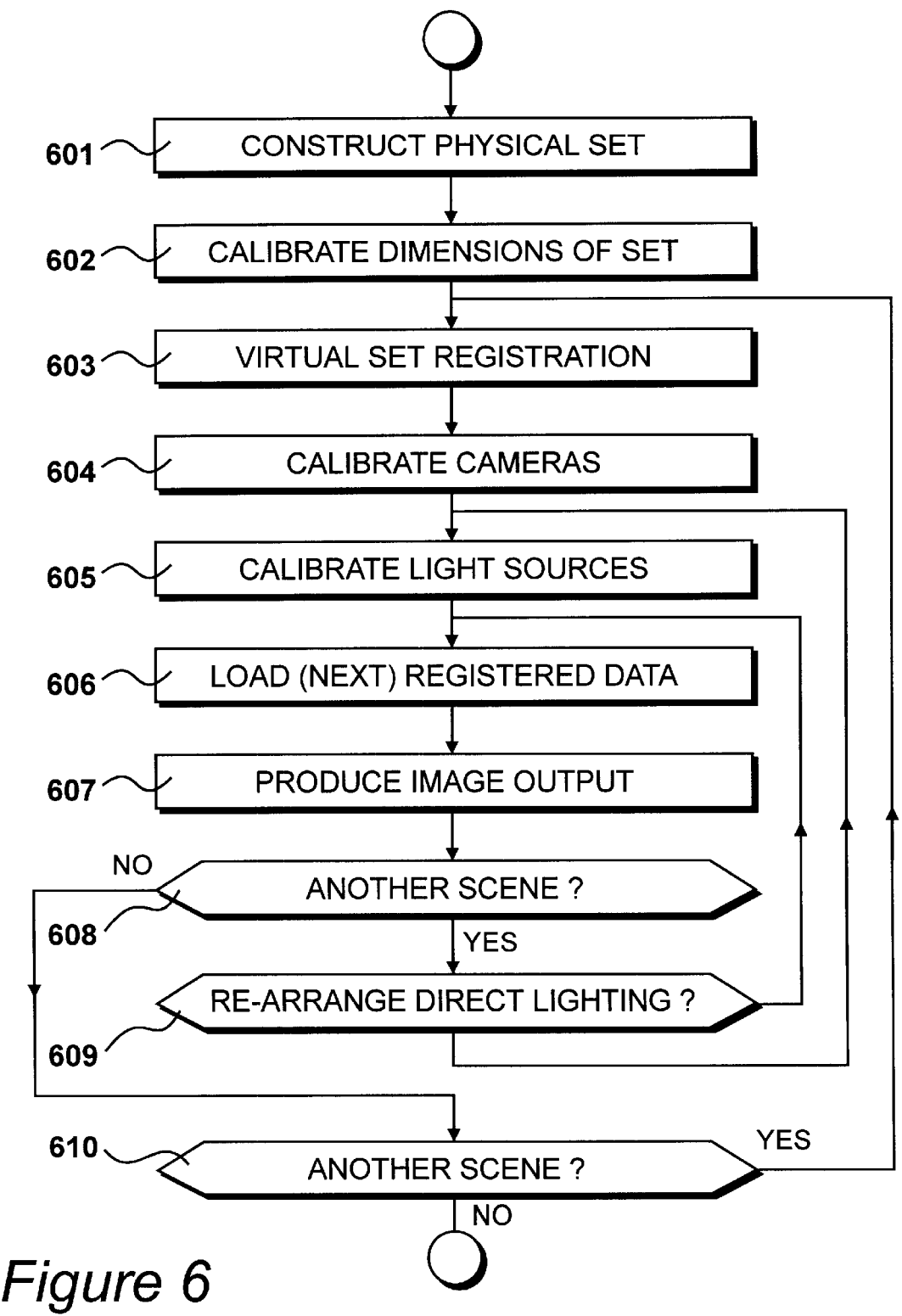
FIG. 6 illustrates the virtual set registration process identified in FIG. 5.

Procedures for generating output image signals on the virtual set environment shown in FIGS. 1 and 2 are identified in FIG. 6. At step 601 the physical virtual set is constructed and, although often built to similar geometries and dimensions, it is appreciated that all real virtual sets will differ to some extent. Thus, at step 602 the dimensions of the set are calibrated using a theodolite or similar accurate measuring equipment.

At step 603 virtual data sets are collected for a particular production process and each of these virtual data sets is registered against the dimensions of the real studio environment so as to produce a registration data set for each world space data set used as part of the production process.

For a particular production the number of cameras required and the position of the cameras will be specified therefore at step 604 the cameras are calibrated within the virtual set. The calibration process involves calibrating signals derived from the camera position sensors such that, for a particular camera orientation, the processing system 201 is able to determine the location within the virtual set that is being viewed so that corresponding position within the virtual environment may be rendered for association with the real images.

In addition to camera positions being defined within the virtual environment, it is also possible to include virtual direct light sources. Direct light sources 105 also include positional transducers similar to the type included on camera 104. Thus, these transducers are calibrated at step 505, thereby allowing processing system 201 to be made aware of the conditions of the light sources such that similar conditions may be applied to the virtual light sources of the type 303 so as to maintain co-ordination between the real light sources and their respective virtual light sources.

After the light sources have been calibrated it is possible to initiate the production of image data. Thus, at step 606 registered virtual world space data is loaded and at step 607 an output is generated. At step 608 a question is asked as to whether another scene is to be produced which, if answered in the affirmative, results in a question being asked at step 609 as to whether the direct lighting is to be rearranged. If the question asked at step 609 is answered in the affirmative, the light sources are re-calibrated at step 605 whereafter processes 606 and 607 are repeated. If the question asked at step 609 is answered in the negative, it is not necessary to re-calibrate light sources and the next virtual scene data may be loaded at step 606. Eventually, all of the scenes of a production will have been produced resulting in the question asked step 608 being answered in the negative. A question is then asked as to whether another production is required and when answered in the affirmative virtual set registration may be repeated at 603.

Figure 8:
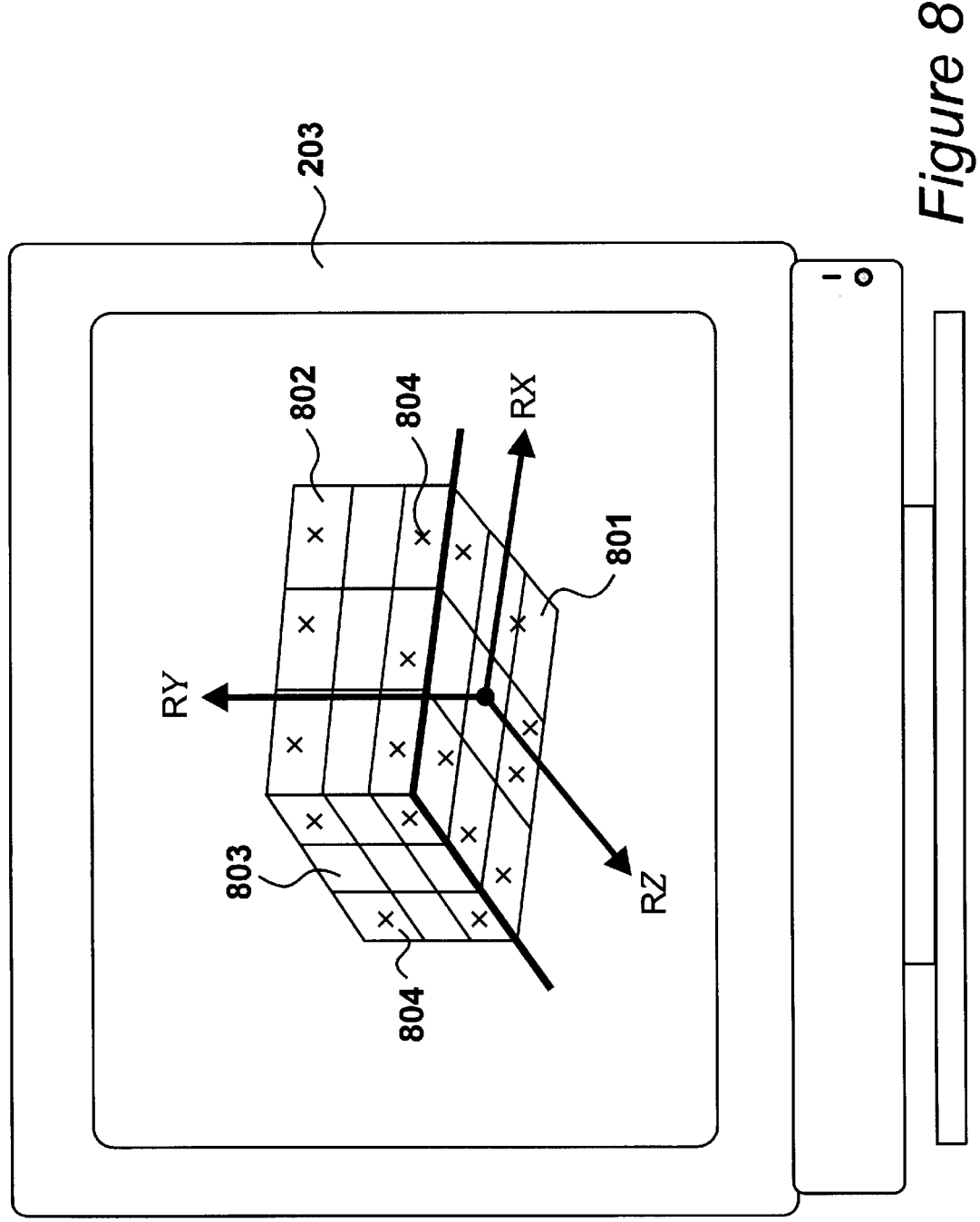
FIG. 8 illustrates the relationship of the planes of the real blue screen studio in relation to axes defined in the real space.

Process 602 for the calibration of set dimensions results in the generation of plane definitions stored in a set dimension file 701 on processing system 201. Thus, a first plane is defined by data 702, the second plane is defined by data 703 and a third plane is defined by data 704. The intersections of the planes are calculated and the data may be represented on VDU 203 as illustrated in FIG. 8. Thus, the real planes 101, 102 and 103 of the set may be represented on visual display unit 203 generated from the data set 701 by planes 801, 802 and 803 respectively.

Positions within the real space shown in FIG. 8 may be identified with reference to real co-ordinates RX, RY and RZ. Furthermore, physical positions defined on the set walls during the measurement process are also identified by positions 804.

Figure 9:
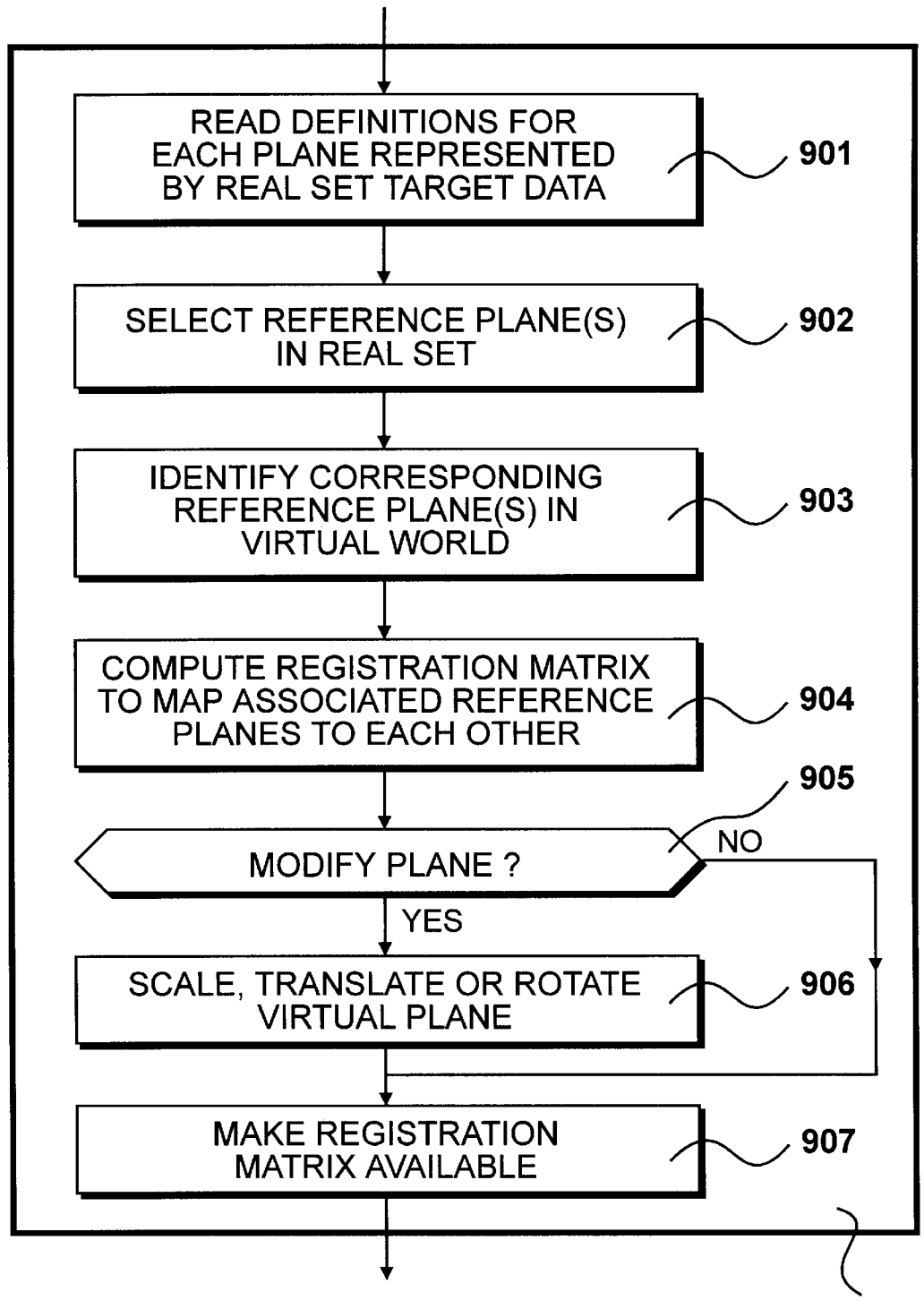
FIG. 9 details the procedure for registering virtual data to the reels set, as identified in FIG. 6.

After dimensions for the set have been calibrated at step 602, registration data for virtual environments may be registered to the real set, as shown at step 603; a procedure which is detailed in FIG. 9. At step 901 definitions for 702, 703 and 704 for planes of the real set are read. At step 902 a reference plane, or a plurality of reference planes, in the real set is selected and at step 903. corresponding reference planes in the virtual world space are identified. At step 904 a registration matrix is computed so as to map associated reference planes to each other. In many applications only a single reference plane is selected and usually the selected reference plane defines the floor upon which talent will be walking. Thus, in many preferred applications, the real floor 101 would be selected as the real image plane and this would be associated with a virtual floor, such as floor 301, for the particular virtual environment under consideration.

At step 905 an operator is invited to make modifications to the presentation of the virtual image (within permitted constraints) such that, at step 906, an operator may scale, translate or rotate the virtual image. Modifications of this type are implemented by making changes to the registration matrix such that artistic preferences may be taken into account and included in the matrix definition. Thereafter, at step 907 the registration matrix is made available to the production personnel. Definitions read at step 901 include plane equations of the form detailed in FIG. 10. A plane may be represented by a normal (ie perpendicular to the plane) and in three dimensions this will be represented by an equation in the form $ax+by+cz+d=0$. An equation of this type may be defined with reference to at least three co-ordinates supplied from the measurement performed with respect to the real data set 702, 703 and 704. Equations for obtaining values for ABC and D in the plane equation are shown in FIG. 10. However, it should be understood that more than three points may be used in combination with equations of this type in order to obtain more accurate values, given that a small degree of error is likely in the measurement of physical points.

Figure 11:
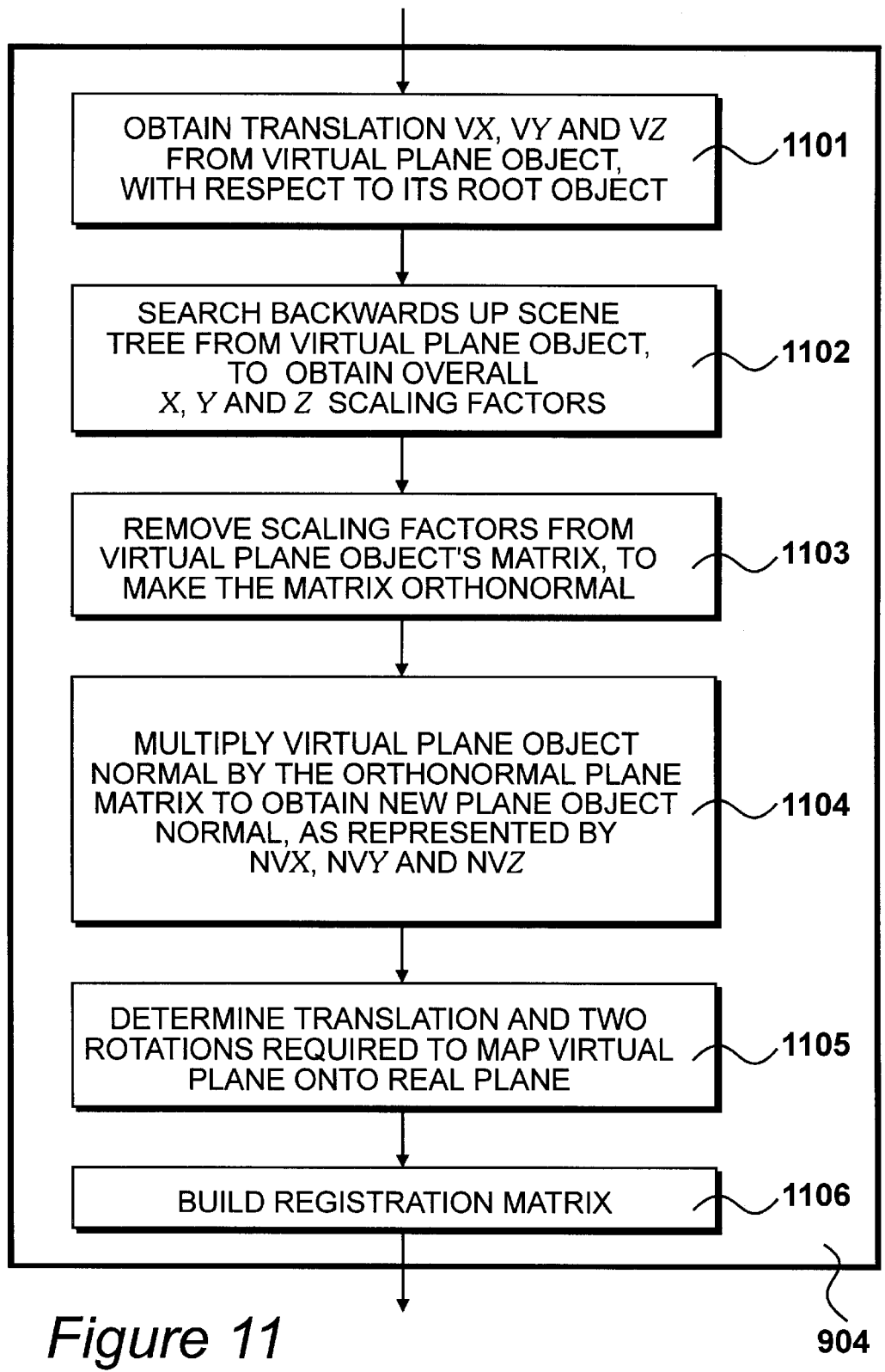
FIG. 11 details procedures for the generation of a registration matrix, identified in FIG. 9.

Step 904 for the generation of the registration matrix is detailed in FIG. 11. At step 1101 values defining the displacement, in terms of the translation, between the selected virtual plane (floor 301) and the main root origin 401 are determined. In the scene tree shown in FIG. 4, the selected virtual plane is represented by a bounded rectangle given that objects in the virtual environment are defined with finite extent. By convention, objects defined in the scene tree have absolute co-ordinate references therefore a displacement or translation may be determined by calculating the difference between absolute positions for the object and its origin. Thus, at step 1101 translation values VX,VY and VZ are determined for the virtual plane object 406 with respect to its root object 401.

The nature of the scene tree allows scaling factors to be introduced at each node such that the overall scaling for a particular object will be derived from a concatenation of the scaling factors applied to each branching point. For the registration process, it is necessary to remove scaling factors therefore at step 1102 a search is performed backwards up the scene tree (shown in FIG. 4) from the virtual plane object to obtain overall XY, and Z scaling factors; achieved by a process of multiplying each scaling factor encountered while traversing up the tree. Thus, at step 1103 the scaling factors are removed from the virtual object's matrix so as to make the matrix orthonormal.

At step 1104 the normal vector of the virtual plane object is multiplied by the orthonormal plane matrix, derived, at step 1103, to obtain a new virtual plane object normal, represented as NVX, NVY and NVZ. This matrix multiplication results in the generation of a normal of unit magnitude identifying a direction normal or orthogonal to the required position of the virtual plane.

Having determined the nature of a translation required in order to move the virtual plane to the position of the real plane at step 1101 rotations are determined at step 1104. These operations are then combined at step 1105 in order to determine the overall transformation, in terms of a translation and two rotations, required in order to map the virtual plane onto the real plane. Thereafter, at step 1006, the registration matrix is built, effectively representing the transformation determined at step 1105.

Figure 12:
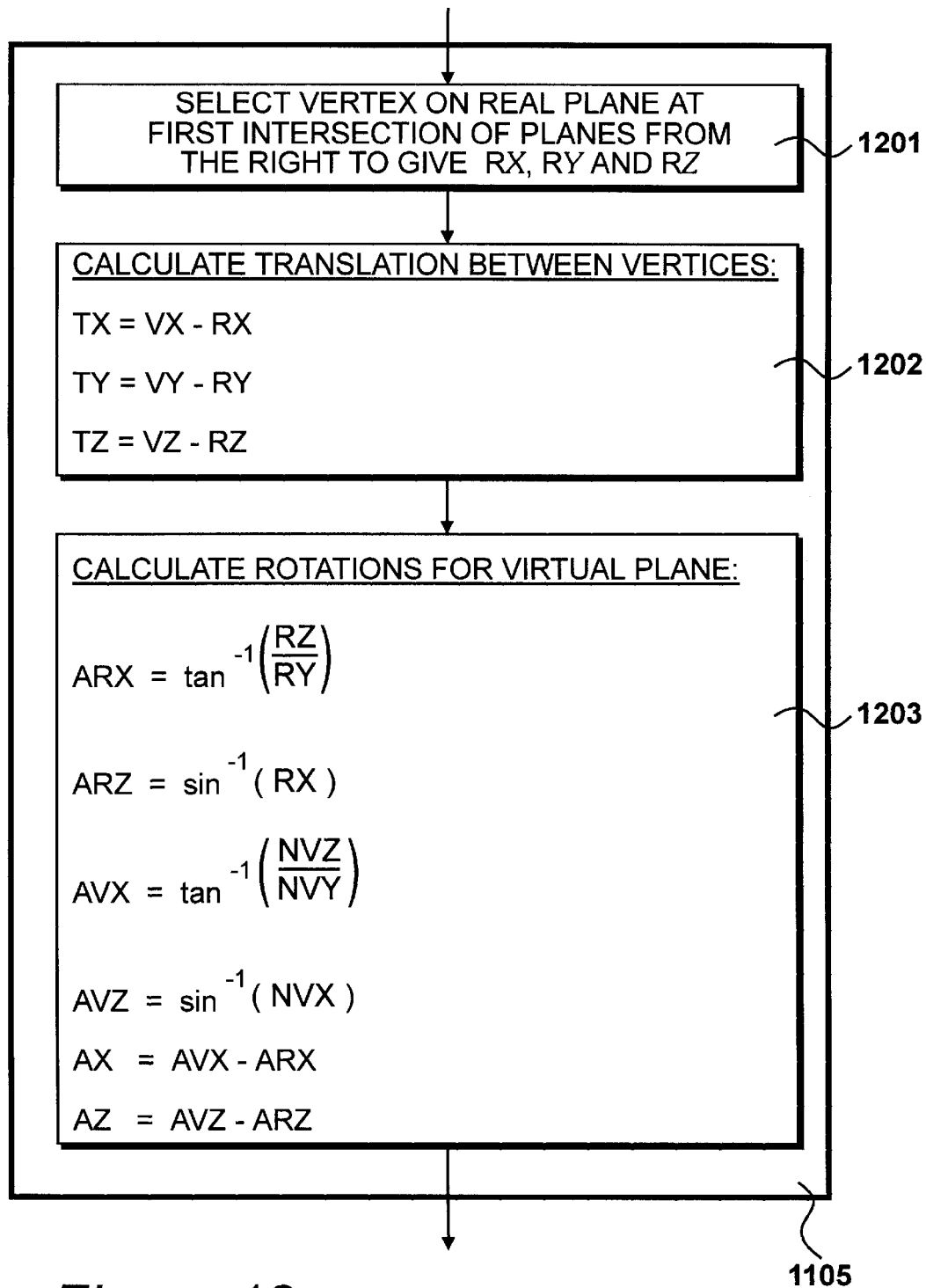
FIG. 12 details procedures for transformation determination identified in FIG. 11.

Step 1105 for the transformation determination is detailed in FIG. 12. At step 1201 a vertex on the real plane is selected which, in the preferred embodiment, is based on selecting the first point at the intersection of planes, moving from the right of the image towards the left of the image, to identify a real co-ordinate point (PY,PR). At step 1202 a translation between vertices is calculated by subtracting the real values selected at step 1201 from their equivalent virtual values to give component translation values. Thus, the translation value in the X dimension is given as the difference between the virtual X position (VX) and the real X position (RX). Similarly, TY is given by VY-RY and TZ is given by VZ-RZ. The values for VX,VY and VZ are the same values determined at step 1101.

At step 1203 calculations are performed in order to identify rotations required for the virtual plane in order to map it onto the real plane. An initial calculation is performed in order to determine a rotation about the real X axis for the real plane and this is given by the arc tangent of (RZ over RY) which is denoted by the angle ARX. A similar calculation is performed in order to obtain angle ARZ, which is given by the arcsine of RX. The calculation or ARZ is simplified with the knowledge that the plane object normal is of unit magnitude.

An equivalent pair of rotations are calculated with respect to the orientation of the virtual plane object, resulting in a pair of angles AVX, which is a rotation about the X axis, and AVZ, which is a rotation about the Z axis, At this point two pairs of angles have been calculated in the real set, and this pair of angles correspond to the rotation that would be required in order to align the real set floor with the real RX RY and RZ axes. In the virtual set, the pairs of rotations corresponds to the rotation that would be required in order to align the virtual floor with the virtual axes VX VY and VZ. Thus, by combining these pairs of angles corresponding to the real and virtual rotations, the total rotation required in order to align the virtual floor with the real floor is given. Thus the total rotation about the X axis, AX, is given by AVX minus ARX and the total rotation about the Z axis, AZ, is given by AVZ minus ARZ.

Having calculated the translations TX, TY and TZ in each of the three dimensions at step 1202, and having calculated the two rotations AX about the X axis and AZ about the Z axis at step 1203, it is now possible to process these values in order to generate the registration matrix. Referring to FIG. 13, the registration matrix is calculated by the concatenation of an identity matrix 1301, with an X rotation matrix 1302 and a Z rotation matrix 1303. The final column of the matrix is then substituted with the translation values TX, TY TZ and unity.

The X rotation matrix shown in FIG. 13 is derived by calculating the cosine and sine of the X rotation value, whereafter appropriate entries are made as illustrated at 1302. Similarly, the Z rotation matrix is determined from the cosine and sine of the Z rotation angle with appropriate substitutions being made as illustrated 1303. Referring to FIG. 14, matrix manipulations are illustrated at 1401, resulting in a registration matrix as illustrated at 1402.

An example of a registration matrix, stored as an ASCII file by processing system 201, is illustrated in FIG. 15. The matrix is represented as a four by four array of values stored to an appropriate level of accuracy; in the example, each entry is stored to an accuracy of four decimal places.

The scene tree illustrated in FIG. 5 is represented as a file stored by system 201 as illustrated in FIG. 16. Thus, the virtual graphics information stored in a file of the type shown in FIG. 16, in combination with it's associated registration matrix stored in a file of the type shown in FIG. 15, allows the virtual environment and the real environment to be successfully combined. Thus, the registration matrix file in FIG. 15 effectively provides a bridge between the independently generated virtual world space and the real environment of the set. Furthermore, the virtual graphical information stored in a file of the type shown in FIG. 16 is not modified and, in combination with other appropriately generated registration matrices, may be employed in other unrelated virtual sets.

Figure 17:
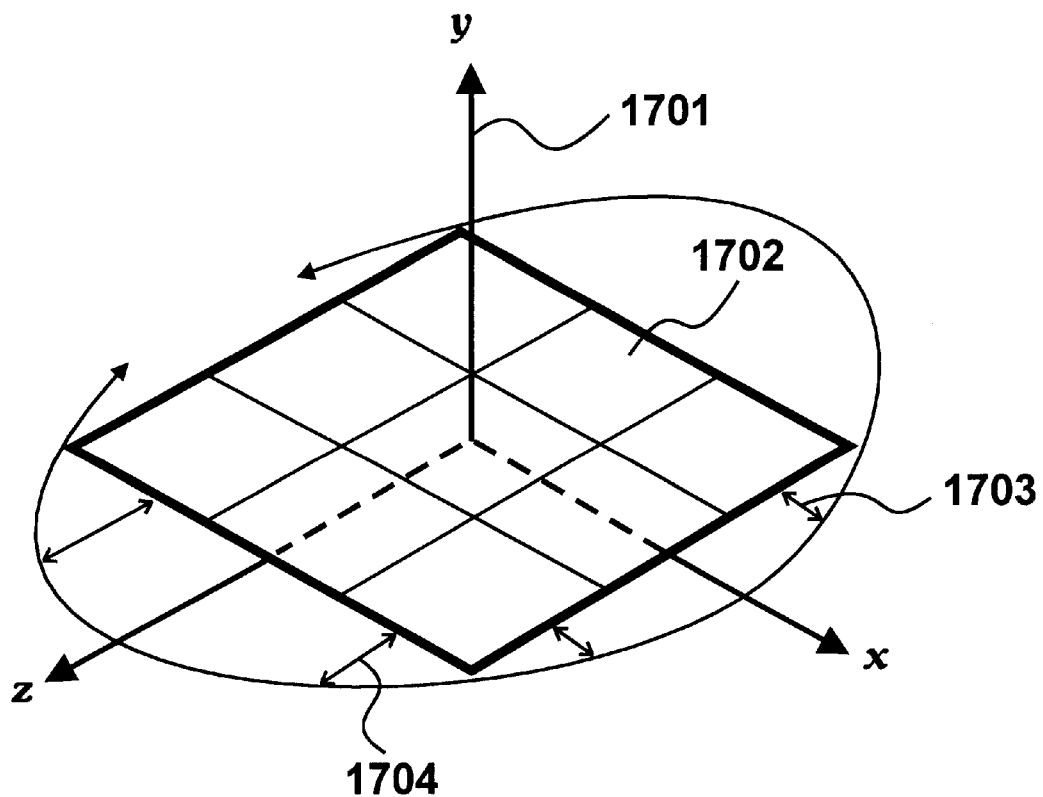
FIG. 17 illustrates a relationship for partially constrained axes.

In the preferred embodiment, a floor in the virtual world space is registered to the floor of the real set such that planar coincidence exists within the two worlds. This relationship is illustrated in FIG. 17, wherein the whole set may be considered as partially or semi-constrained. The X Y and Z axis 1701 represent the axis of the real space whereas rectangle 1702 is an object derived from the virtual world registered to the XZ floor of the real space. Thus, the virtual floor defines a plane which is coincident with a plane defined in the real set. Modifications may be made to the registration provided that the real plane and the virtual plane remain coincident. Thus, the virtual plane may be rotated about the Y axis or it may be scaled in both the X and Z directions, as indicated by arrows 1701 and 4704 respectively.

Figure 18:
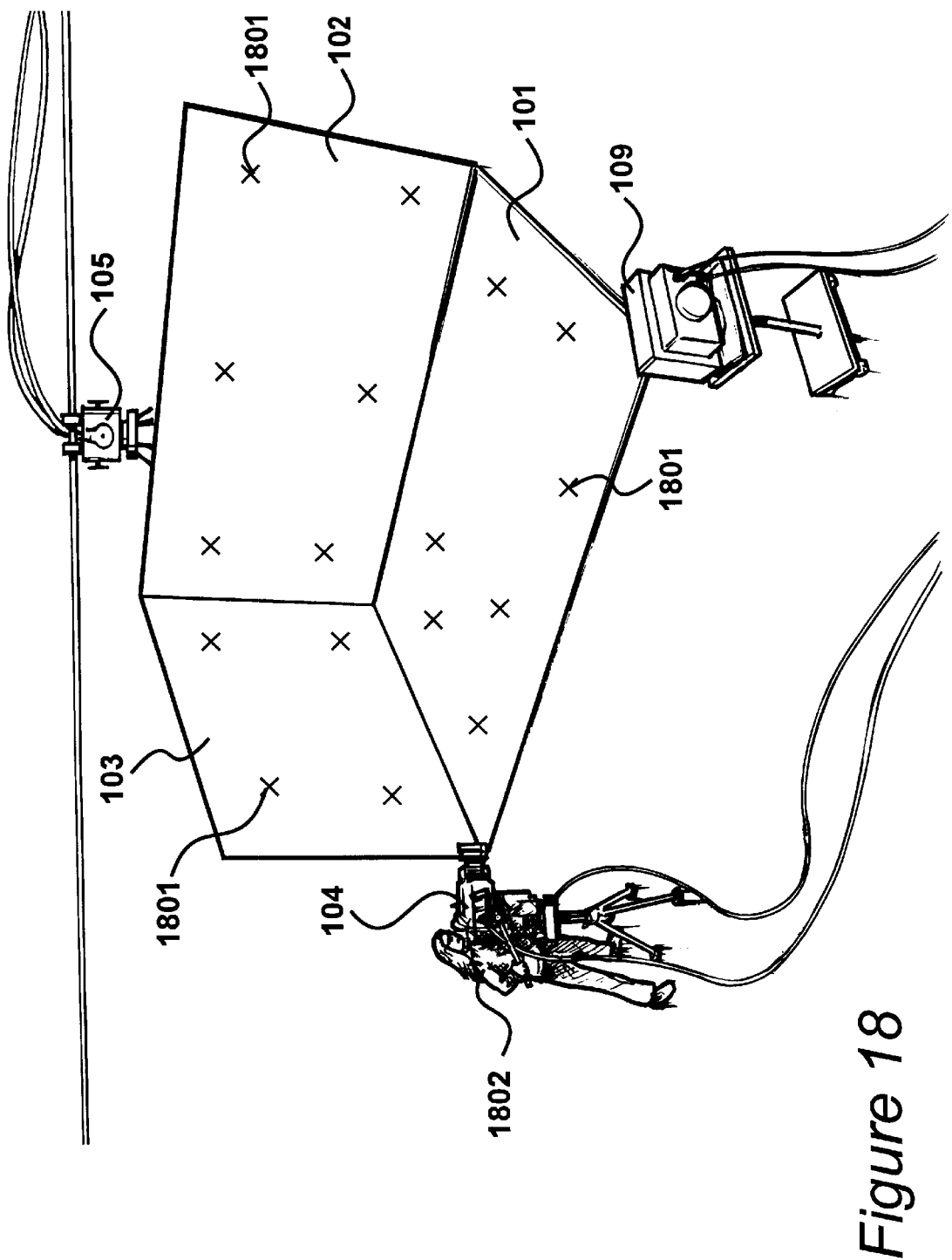
FIG. 18 details camera calibration procedures identified in FIG. 5.

Camera calibration identified at step 504 is illustrated in FIG. 18. A plurality of points 1801 are made visible on the real screen planes which correspond to known positions 802 of the real plane data as illustrated in FIG. 8. After locating camera 104, a camera operator 1802 moves the camera to each visible location 1801 and focuses the camera so as to provide a sharp picture of said positions. Positional values derived from the camera sensors are stored for each defined position 1801 and from this positional information, camera calibration values are calculated such that, for any positional orientation applied to the camera 104, it is possible to identify the actual position in the set that is being viewed by the camera.

After calibrating the camera at step 504 similar procedures are performed at step 505 for calibrating light sources. In the example shown in FIG. 18, a single direct light source 105 is provided which includes mechanisms to allow two degrees of rotational movement so that a beam directed from the light source 501 may be positioned anywhere within the real set. Thus, the light source 105 may be adjusted so that its beam is directed at positions 1801 and again information derived from sensors attached to the light source 105 are supplied to the processing system 201 allowing calibration procedures to be performed.

Figure 19:
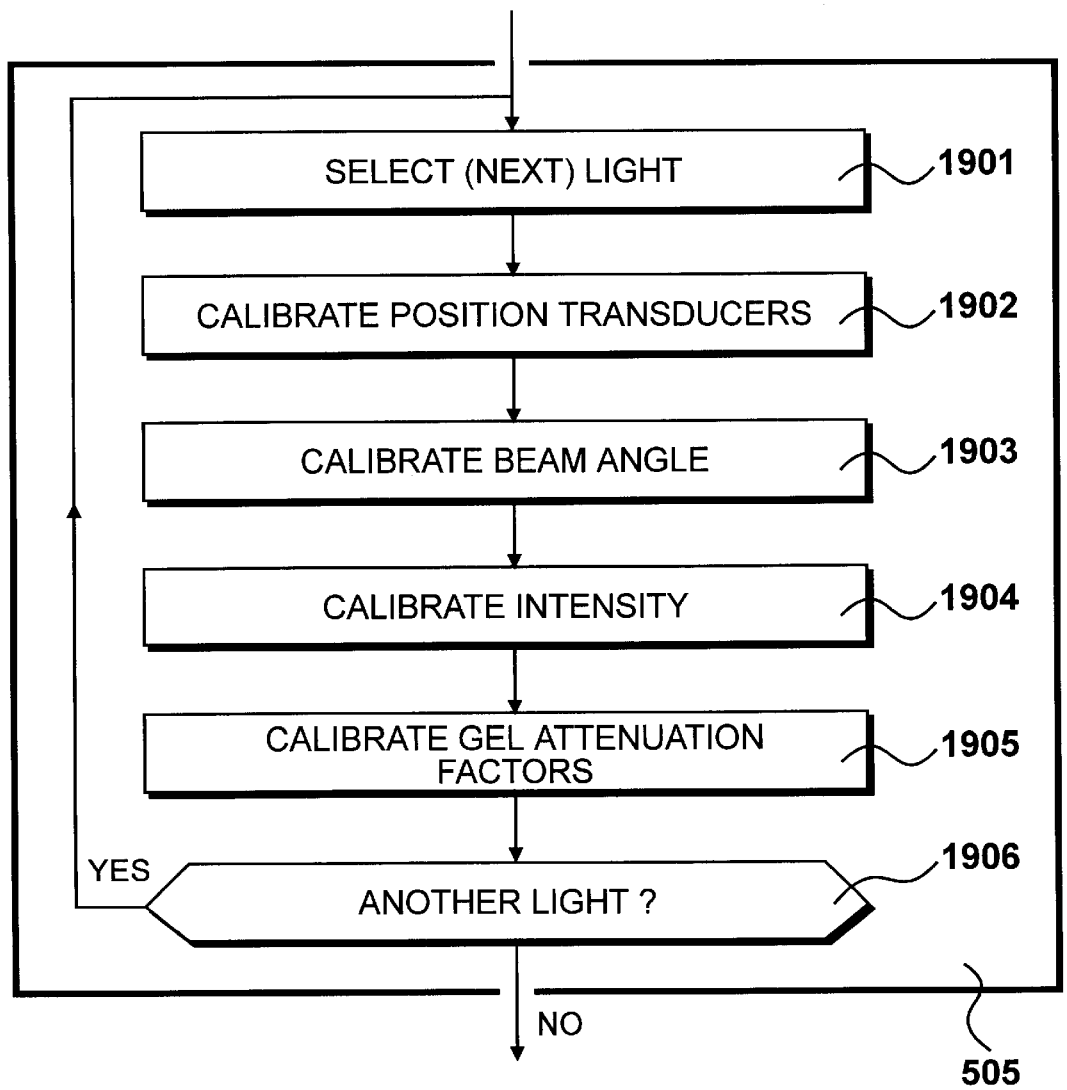
FIG. 19 details a process for the calibration of light sources, identified in FIG. 5.

Process 505 for the calibration of light sources is detailed in FIG. 19. At step 1901 a light source is selected and at step 1902 positional transducers are calibrated by moving the light to positions 1801 as identified in FIG. 18.

At step 1903, beam angle calibration is performed by adjusting the beam angle and effectively measuring the size of the resulting illuminated spot. At step 1904 beam intensity is calibrated and at step 1905 gel attenuation factors are calibrated. At step 1906 a question is asked as to whether another light is to be calibrated and if answered in the affirmative the next light is selected at step 1901.

Figure 20A:
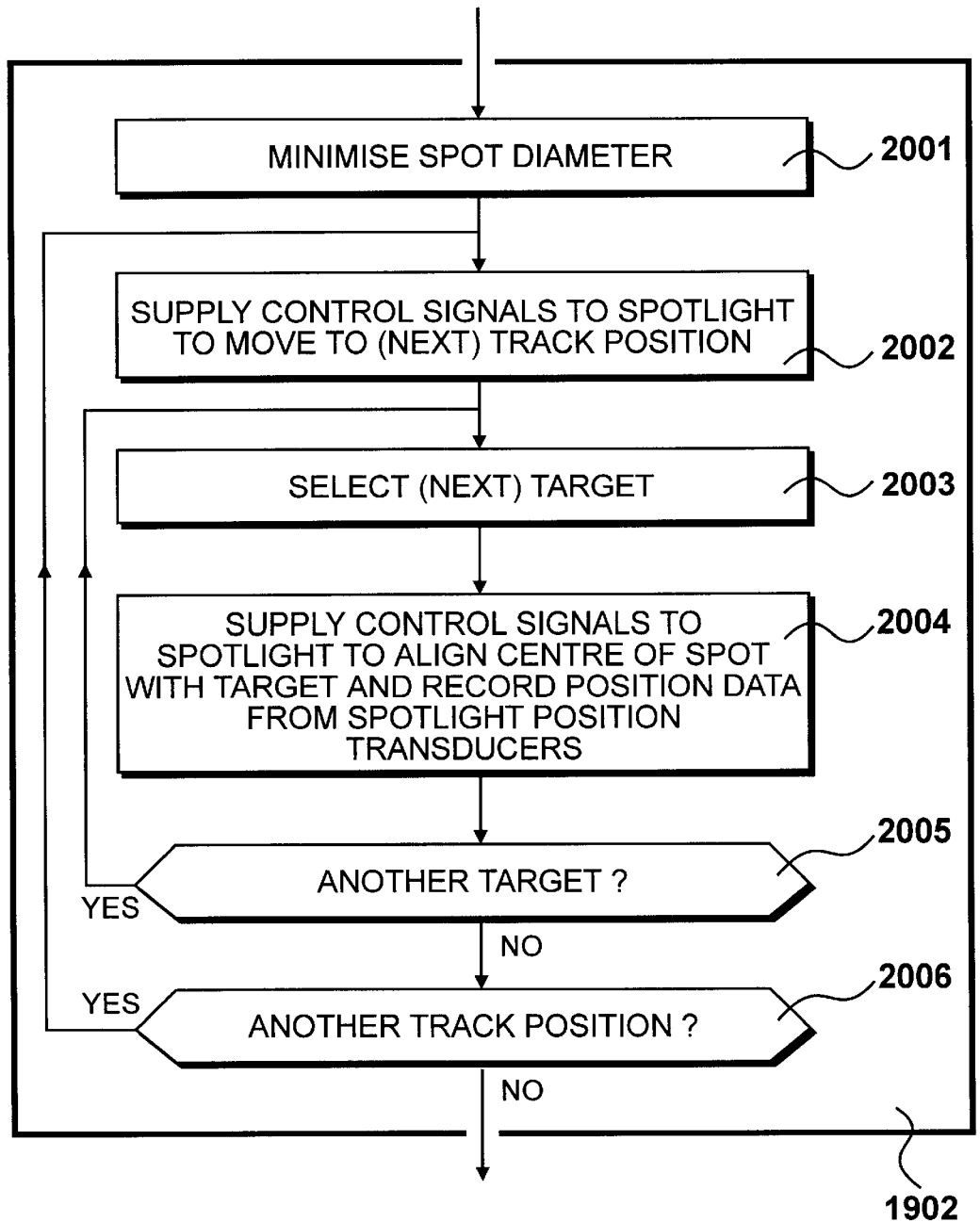
FIGS. 20A–20B detail the process for the calibration of position transducers, identified in FIG. 19.
Figure 20B:
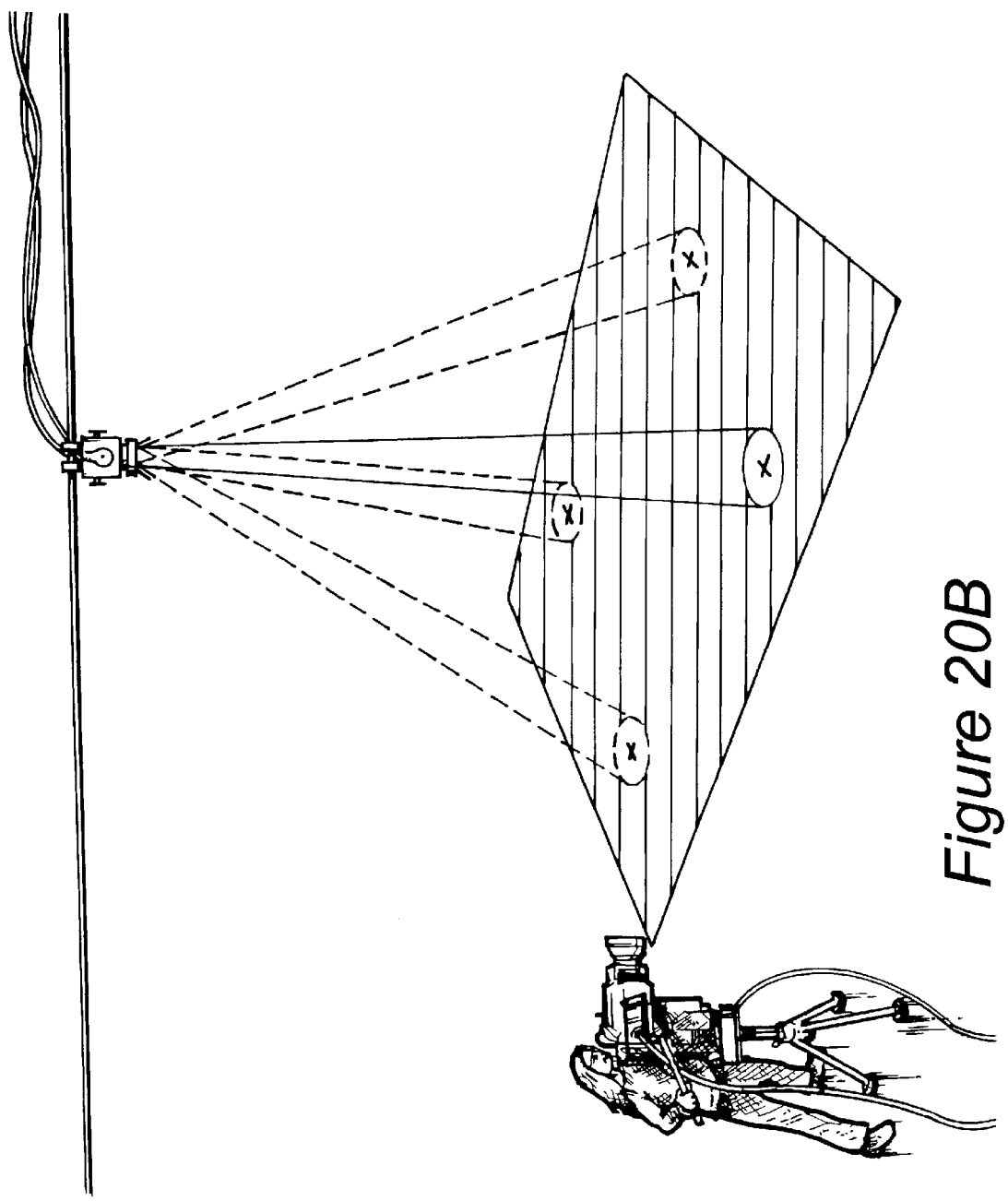

Process 1902, for the calibration of position transducers, is detailed in FIG. 20A. At step 2001 the spot diameter for the light is minimised and at step 2002 the light is moved to a particular track position. Thereafter, at step 2003 the light is rotated so that the centre of the spot is presented to a known position 1801 on the set floor 101. Thus, at step 2004 positional data, derived from the spotlight position transducers is recorded and associated with the particular physical location on the set floor.

At step 2005 a question is asked as to whether another target position is to be considered and when answered in the affirmative control is returned to step 2003. After all target positions for a particular track position have been considered, the question asked at step 2005 is answered in the negative and a question is asked at step 2006 as to whether another track position is to be considered. When answered in the affirmative, control is returned to step 2002 and procedures repeated. Eventually, all track positions will have been considered and the question asked at step 2006 will be answered in the negative.

Two track locations are required in order to perform triangulation calculations but preferably three locations are selected in order to improve accuracy. This allows the notional position of the beam to be determined in response to transducer values derived from track position.

For a track position, it is possible for a spotlight to rotate with respect to two perpendicular axes, such that the beam is seen transversing substantially from right to left or substantially from back to front. However, the actual movements will not be perfectly aligned with the walls of the virtual set therefore calibration is necessary in order to determine the actual position of the rotation axes. Thus, for each track position it is necessary to identify at least three positions of the spot, but preferably four, so that the position of the axes may be determined; as shown in FIG. 20A.

Figure 21A:
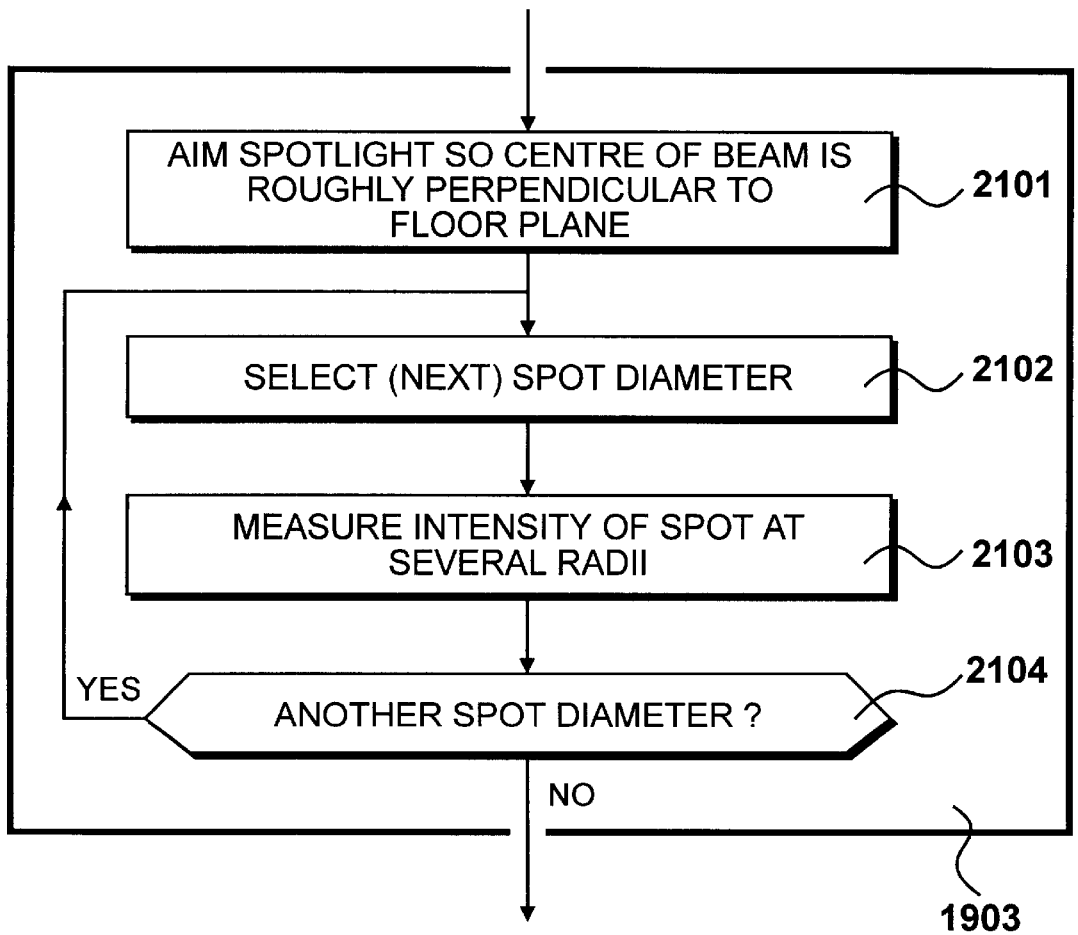
FIGS 21A–21B illustrate the measurement of intensity values for the spotlight at different radial positions from the spot centre.

Process 1903 for the calibration of beam angle is detailed in FIG. 21A. At step 2101 a spot light is positioned so as to centre the beam approximately perpendicular to the floor plane and thereby present a substantially circular spot on the floor plane. In this way, the spot has a clearly identifiable centre and intensities measured radially from the spot will be substantially similar irrespective of circumferencial location.

Figure 21B:
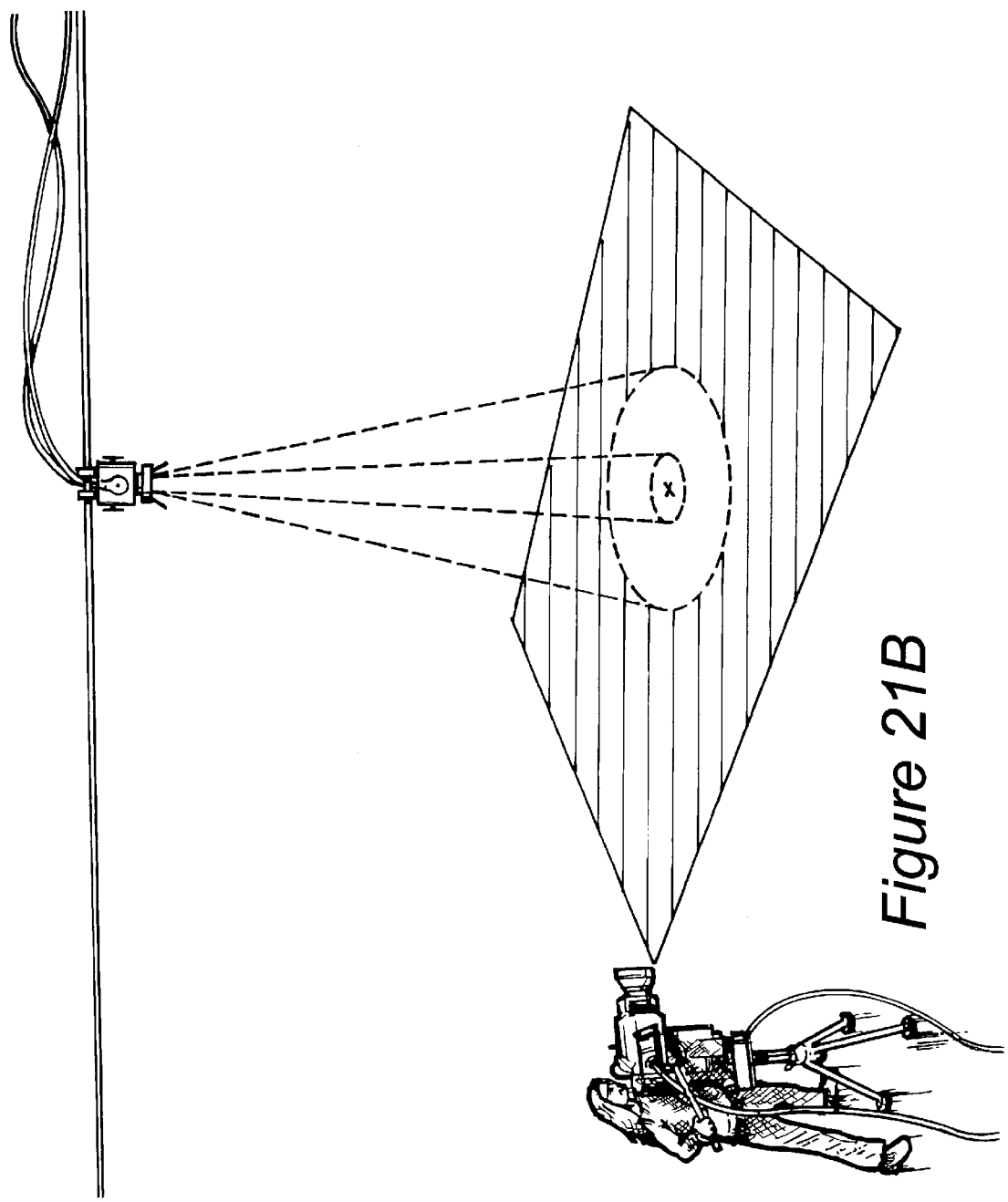

At step 2102 a spot diameter is selected and at step 2103 a plurality of intensity values are measured for the spot at different radial positions from the spot centre; as shown in FIG. 21B. Intensity value may be determined by use of the camera 104 or, alternatively, light measuring equipment may be deployed.

Figure 21C:
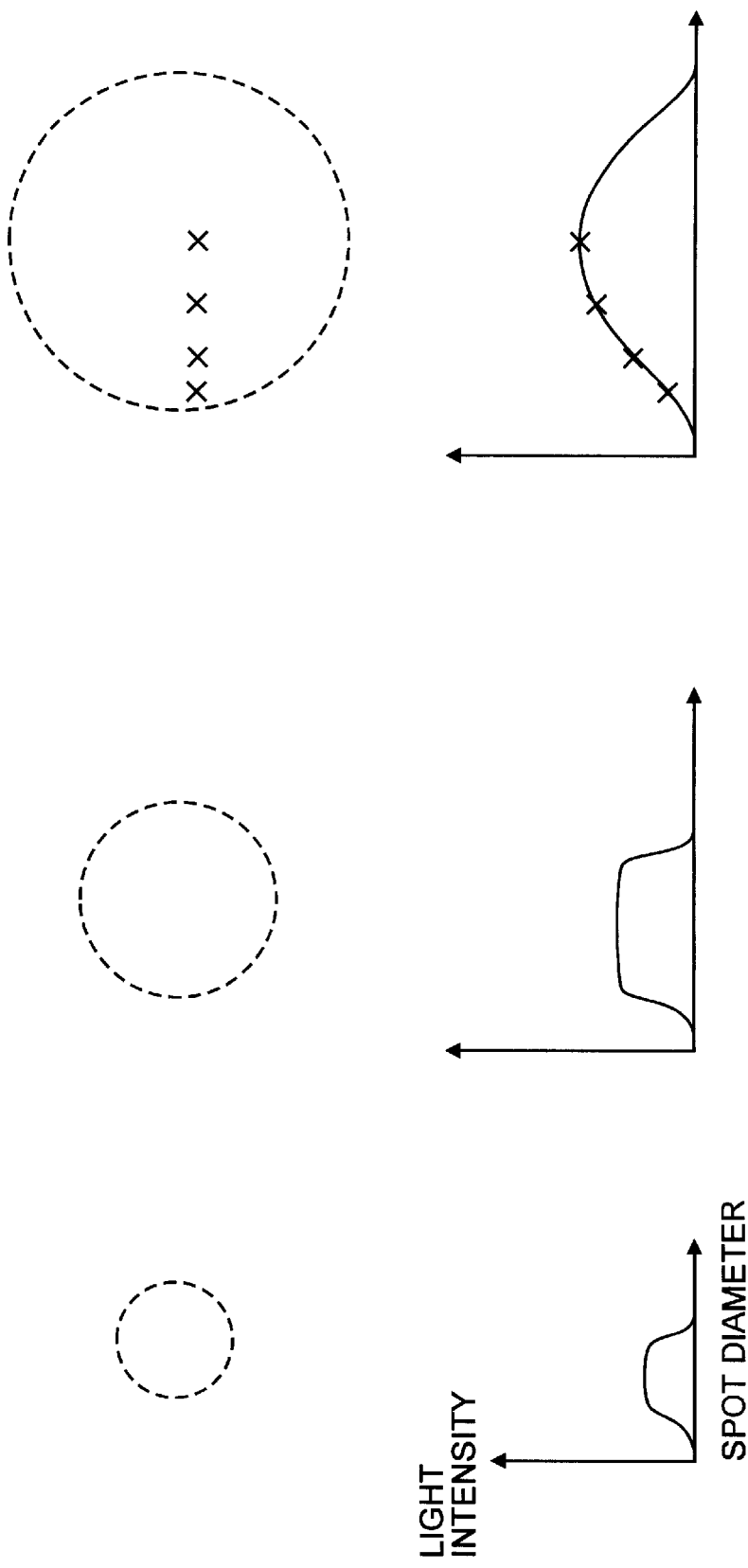
FIG. 21C illustrates relationships between spot diameter and light intensity.
Figure 22:
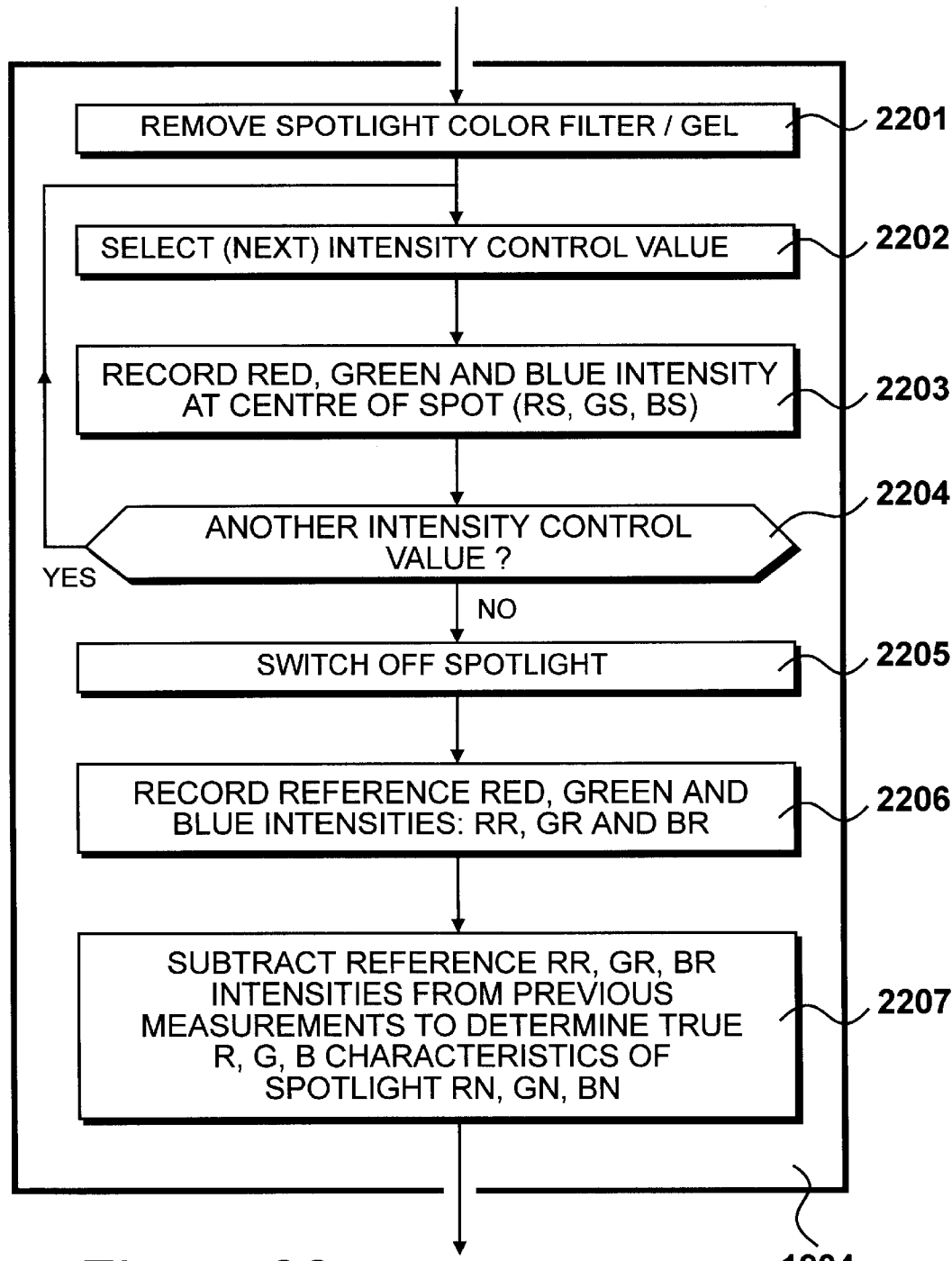
FIG. 22 details the process for the calibration of the light intensity identified in FIG. 19.

At step 2104 a question is asked as to whether another spot diameter is to be considered and when answered in the affirmative control is returned to step 2102, where the next spot diameter is selected. Relationships between spot diameter and light intensity are shown in FIG. 21C.

Process 1904 for the calibration of the light intensity is detailed in FIG. 29. At stop 2201 all spot light filters and gels are removed and at step 2202 an intensity control value is selected. At step 2203 red, green and blue intensity values are recorded at the centre of the spot and at step 2204 a question is asked as to whether another intensity control value is to be considered.

At step 2205 the spotlight is switched off and reference values (RR, GR and BR) for the red, green and blue intensities are recorded a step 2206. At stop 2207 normalised intensities (RN,GN,BN) are determined by subtracting the reference values (RR,GR,BR) determined at step 2207 from the spot values (RS,GS,BS) determined at step 2204.

Figure 23:
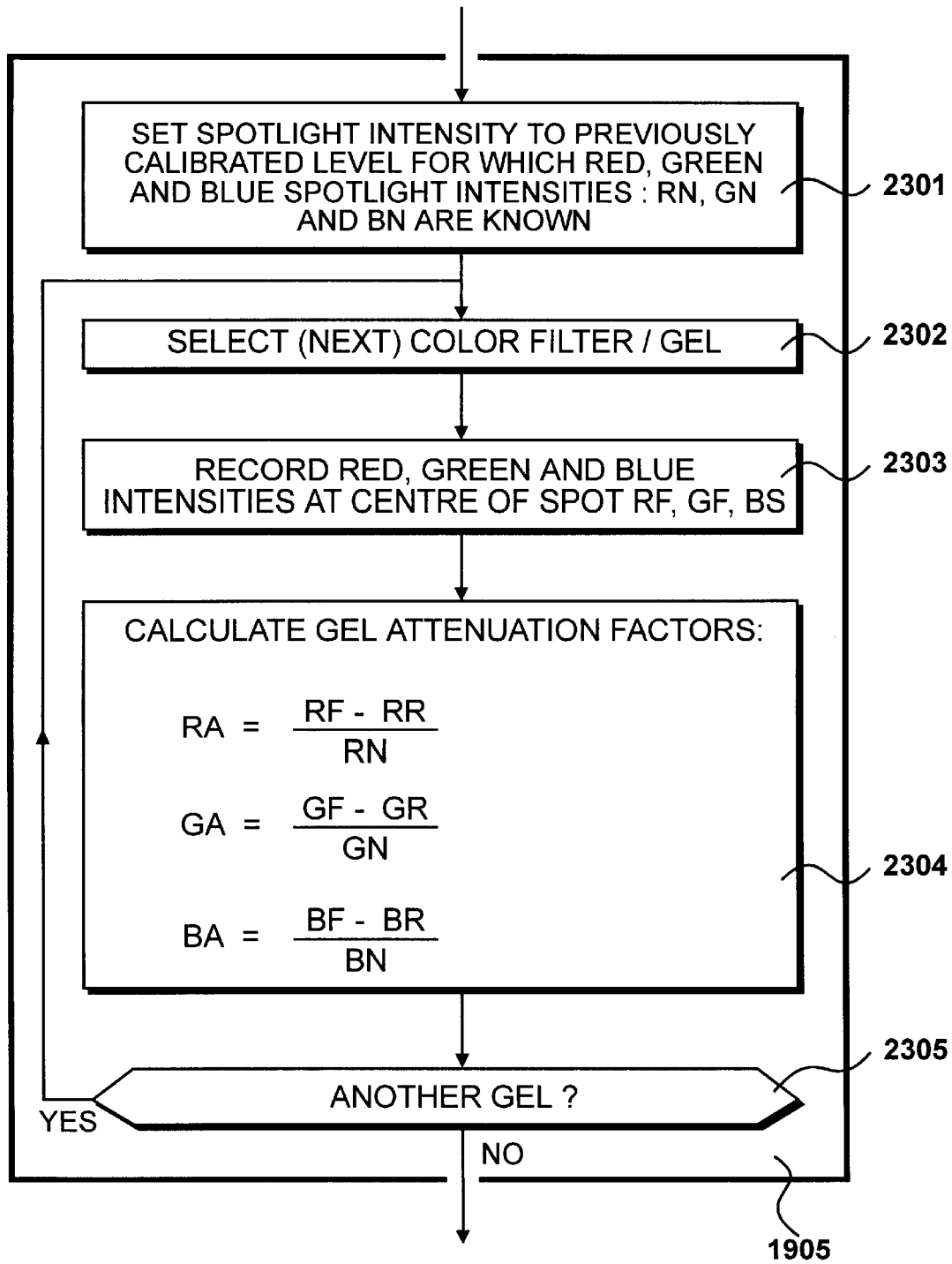
FIG. 23 details the procedure for determining the attenuation effects of gels and filters, identified in FIG. 19.

After calculating the normalised intensities (RN,GN,BN) for particular spot intensity values, it is possible to determine the attenuation effects of gels and filters at step 1905, as detailed in FIG. 23. At step 2101 a spotlight intensity is set to a previously calibrated level for which the normalised red green and blue spot light intensity values (RN,GN,BN) are known.

At step 2302 a colour filter or gel is selected and at step 2303 filtered red, green and blue intensities (RF,GF,BF) are recorded.

At step 2304 gel attenuation factors are calculated. Thus, a red attenuation factor (RA) is calculated by subtracting the red reference value (RR) from the filtered red value (RF) and dividing this value by the normal red value calculated at step 2208 (RN). As shown in FIG. 23 similar calculations are performed for the green attenuation factor (GA) and the blue attenuation factor (BA).

At step 2305 a question is asked as to whether another gel is to be considered and if answered in the affirmative the next gel or filter is selected at step 2302. Eventually, all of the gels and filters will have been considered and the question asked at step 2305 will be answered in the negative.

Figure 24:
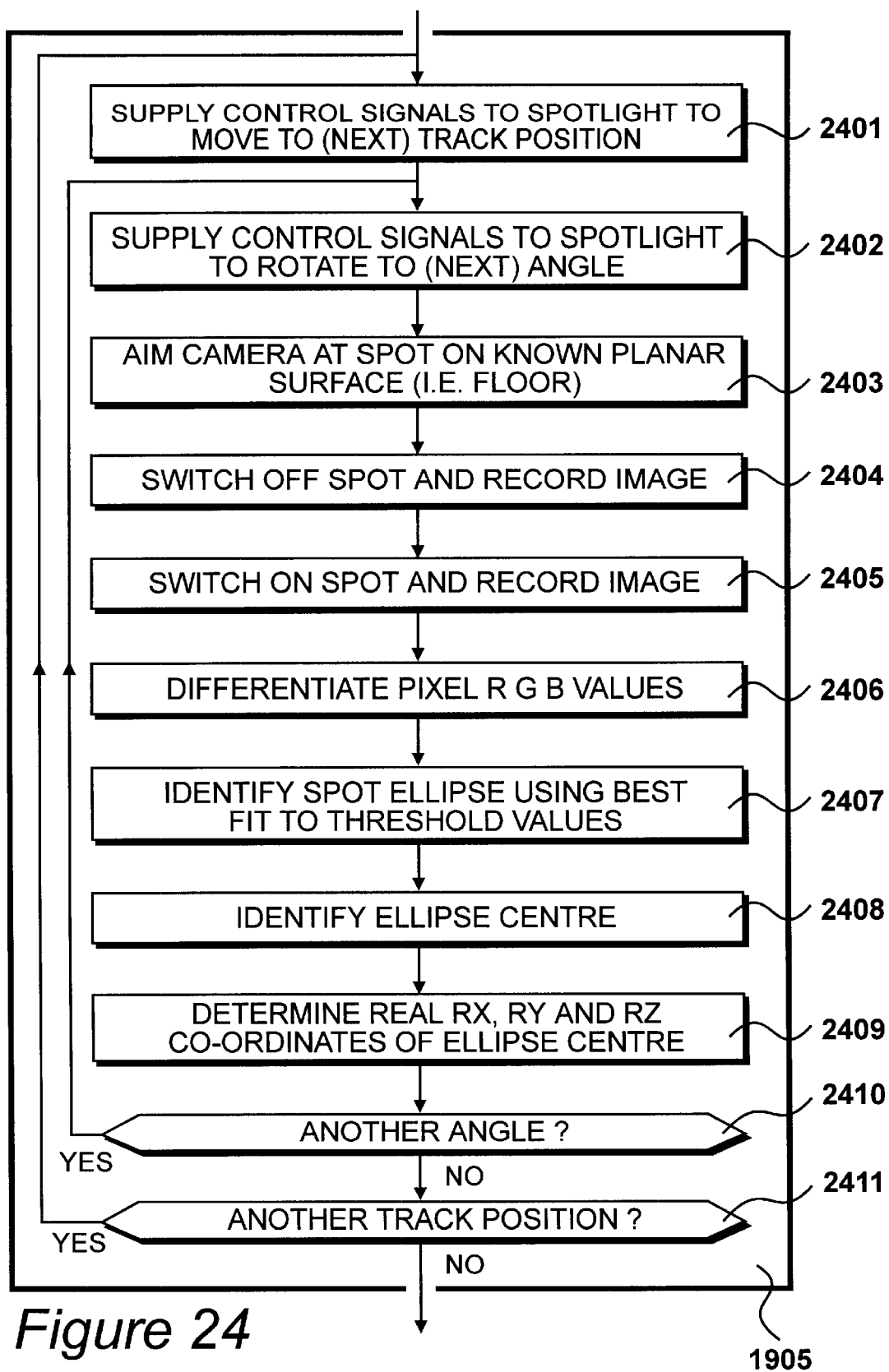
FIG. 24 identifies an alternative procedure for calibrating position transducers.

An alternative procedure for calibrating position transducers is illustrated in FIG. 24. At step 2401 a spotlight is moved to a pre selected track position and at step 2402 the spotlight is rotated so as to position the light at a pre-selected position on the floor of the set. At step 2403 the camera 104 is directed at the light which, being directed on the floor 101 of the set, is effectively positioned upon a known planar surface.

Figure 25:
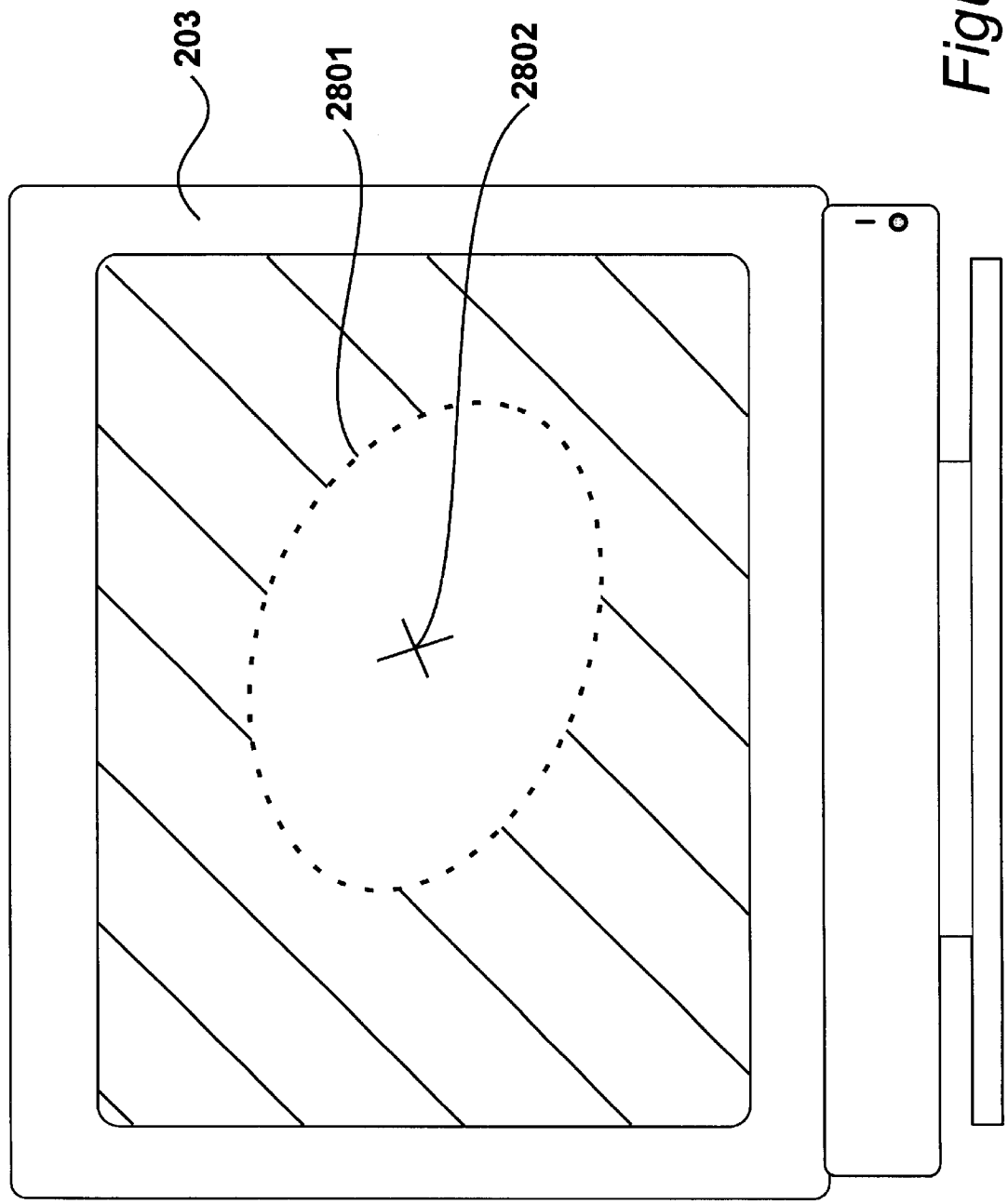
FIG. 25 illustrates a spot as viewed on a monitor.

As shown in FIG. 25, the spot diameter is kept relatively small but the camera is zoomed such that the area of the spot 2801 takes up a relatively large area of the display screen 203.

At step 2404 the spot light is switched off and the image is recorded. At step 2405 the spot light is switched on and the image recorded again.

At step 2406 pixel difference values are determined by subtracting pixel values recorded at step 2404 from pixel values recorded at step 2405.

Irrespective of the actual position and shape of the spot, the geometry determines that the spot will be elliptical in shape. An edge detection process is performed at step 2407 so as to identify a best fit to the ellipse edge 2501 defined by the spot generated from the spotlight.

At step 2408 the centre 2501 of the ellipse is identified and at step 2409 real position co-ordinates (RX,RY,RZ) in the set are determined for the ellipse centre 2402.

At step 2410 a question is asked as to whether another angle is to be considered and when answered in the affirmative control is returned to step 2402 allowing the next angle to be selected. After all of the angles have been considered, the question asked at step 2410 is answered in the negative and a question is asked at step 2411 as to whether another track position is to be considered. When answered in the affirmative, control is returned to step 2401 and the next track position is selected. Eventually all angles for all track positions will have been considered and the question asked at step 2411 will be answered in the negative.

After using the alternative technique shown in FIG. 24, procedures for calibrating the angle (1903), calibrating beam intensity (1904) and calibrating gel attenuation factors (1905) may be performed with reference to the spot locations determined using the procedure shown in FIG. 24.

Figure 26:
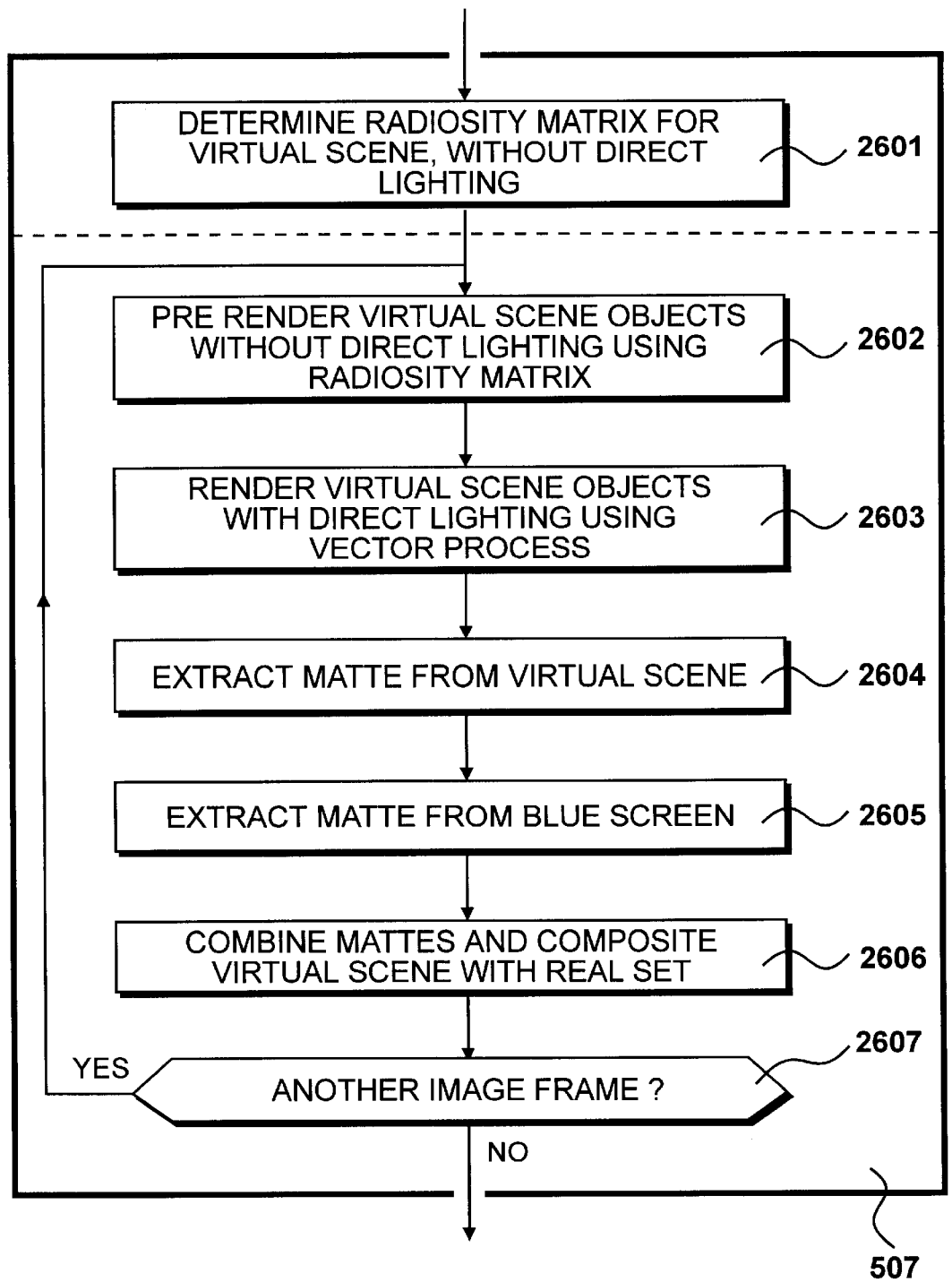
FIG. 26 details procedures for producing output images.

Procedures 507 for producing output images are detailed in FIG. 26. Prior to real time operation, an initialisation process 2601 is performed to determine a radiosity matrix for the virtual scene, without direct lighting. Thereafter, steps 2602 to 2607 are performed in real time in order to produce output images.

At step 2602 the virtual scene objects are pre-rendered without direct lighting using the radiosity matrix generated at step 2601.

At step 2603 the virtual scene objects are rendered with direct lighting using conventional vector processes.

At step 2604 a matte is extracted from the virtual scene for objects which may be considered as foreground objects in the virtual scene.

At step 2605 a matte is extracted from the blue screen and at step 2606 a composite matte is generated, with foreground/background priorities, so as to combine the virtual scene with information derived from the real set. Thereafter, a question is asked at step 2607 as to whether another frame is to be produced and when answered in the affirmative control is returned to step 2602.

Procedures for combining real lighting with virtual lighting may be implemented with manually operated spotlights or may be implemented with spotlights driven by remote control. With manually operated spotlights and with remote control spotlights it is possible for spotlight positions to be moved and for virtual lights within the virtual environment in response to these real movements. In addition, when using remote controlled spotlights, it is possible to define a light movement in the virtual environment and for the real lights to be moved in response to animation data generated from the processing system.

Figure 27:
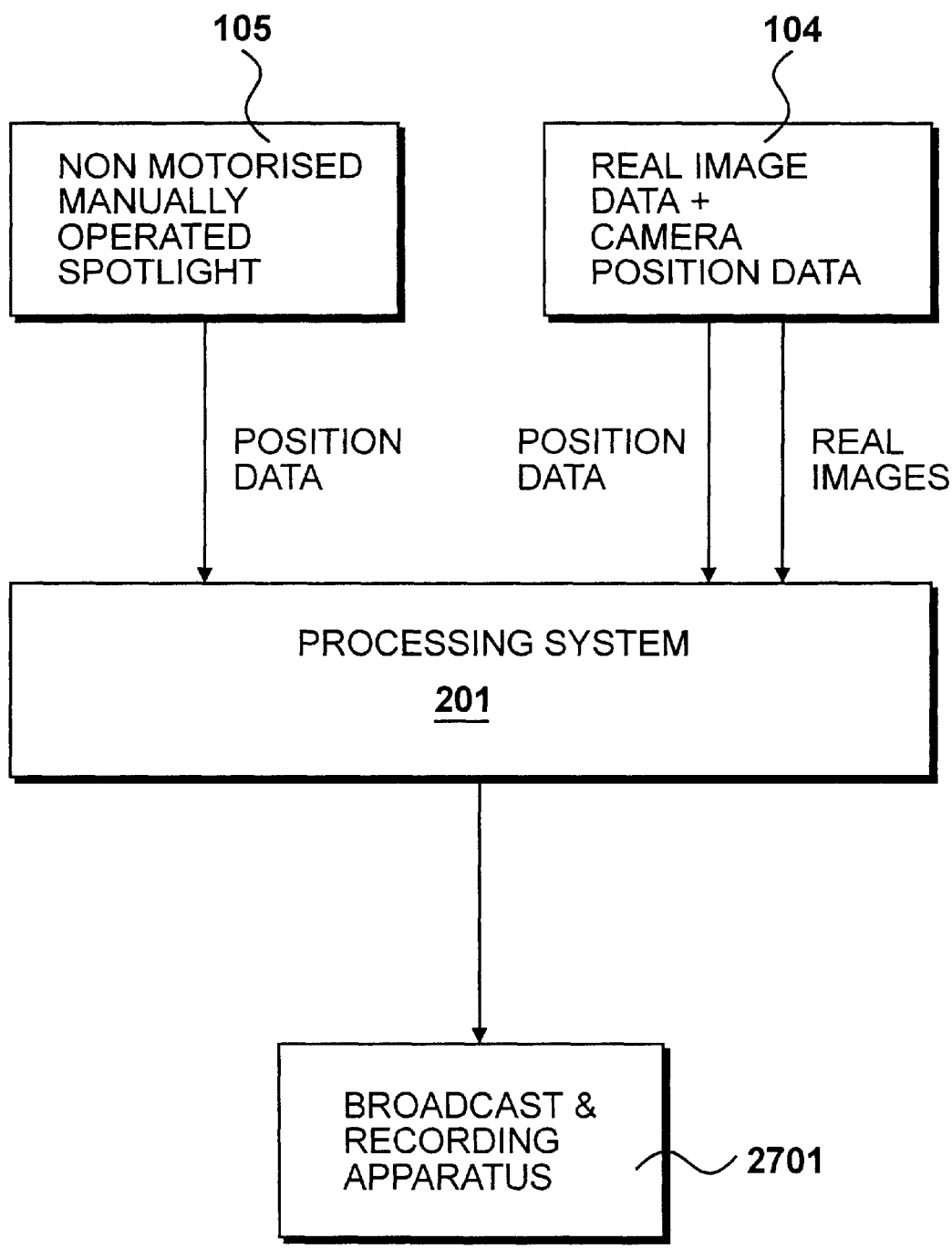
FIG. 27 details an arrangement for manually operating spotlights.

An arrangement for manually operated spotlights is shown in FIG. 27. The spotlights 105 supply positional data to the processing system 201, which also receives positional data and real image data from the camera 104. The processing system combines this real information with virtual information to produce a video output to a broadcasting or recording apparatus 2701.

Figure 28:
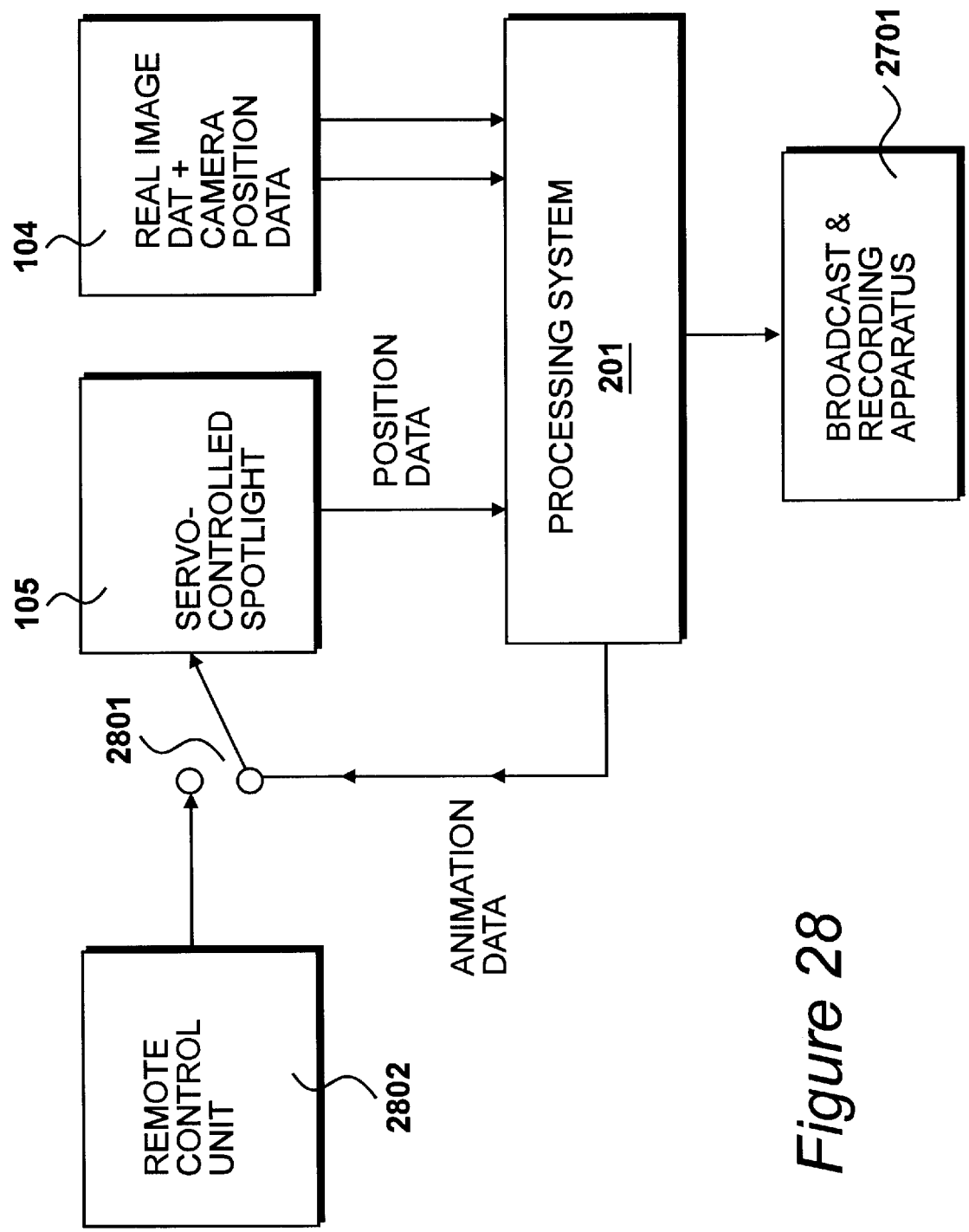
FIG. 28 details an arrangement for using remote controlled spotlights.

An arrangement for using remote controlled spotlights is shown in FIG. 28. Spotlight 105 supplies positional data to a processing system 201 which also receives positional data and real images from camera 104. The arrangement shown in FIG. 28 is capable of operating in three modem. In a first mode a switch 2801 is placed in an upward position such that the servo-controlled spotlight 105 receives control information from a remote control unit 2802. The remote control unit 2802 includes manual controls therefore this mode of operation is substantially similar to the manual form of operation shown in FIG. 27, although it would be expected to allow more sophisticated and smoother movements of the spot lights through the set.

In a second mode of operation, switch 2801 is placed in its lower condition (as shown in FIG. 28) such that control of the spot lights is made form the visual data as an alternative to the virtual light being controlled by the real positions. Thus, within the processing system 201, virtual information includes animation data for lights such that virtual lights are moved within the virtual world space while the real lights in the real set are co-ordinated to these movements in response to animation data received from the processing system. Positional data from the server controlled spotlights is returned to the processing system therefore the processing system 201 is operating in a closed servo control loop such that its output signals, supplied to the servo-controlled spotlights as animation data, may be compared against the positional data received from the spotlights.

A third mode of operation is similar to the second mode of operation but the operation is performed as an open loop process as distinct from a closed loop process. Consequently, when animation data is being supplied to tho servo control spotlights 105, positional data from the spot lights is effectively ignored, thereby opening the servo control loop.

Under all three modes of operation, output video signals are supplied to the broadcast or recording apparatus 2701 in conventional manner.

In the preferred embodiment, the virtual set allows talent 106 to interact with the virtual environment and it is therefore preferable for the whole system to operate in real time, such that the virtual images are generated at video rate. In this way, talent working with the virtual set sees an image substantially similar to that sent out as the video output, such that the whole virtual image is perceived in real time.

In an alternative embodiment, lower definition virtual images are generated in real time and recorded. Subsequently, as an off-line process, the definition of the virtual images is improved and the low definition images are replaced by improved high definition images. A disadvantage of such an approach is that talent working with the virtual set cannot see the virtual images at full definition but an appropriate level of definition can be provided enabling talent to interact as required. However, an advantage of this process is that more sophisticated techniques may be used for the rendering of the virtual images which is particularly effective when light sources are being combined. Thus, basic vector processes, as identified at step 2603, may be replaced by more sophisticated processes such as ray tracing so as to improve the overall realism of the effect. Consequently, this allows the application of virtual sets to be extended into regions where a more realistic background is essential for the production to be effective.

What we claim is:

1. A virtual set in which real image data is combined with synthesised image data, including a real camera configured to generate said real image data;
   a real light source configured to direct light towards real entities within the set;
   synthesising means configured to synthesise virtual image data including a synthesised virtual light source;
   combining means configured to combine said real data with said synthesised data; and
   co-ordinating means configured to co-ordinate said real light source with said synthesised virtual light source so that said teal light and said synthesised virtual light appear as if originating from substantially the same light source.

2. A virtual set according to claim 1, including means for calibrating position transducers for said real light source.

3. A virtual set according to claim 2, wherein said calibrating means are calibrated by directing said real light source at target positions on virtual set walls.

4. A virtual set according to claim 2, wherein said position transducer calibrating means are calibrated by directing said real light source at known planar surfaces in a virtual set, including means for analysing the shape of resulting ellipses.

5. A method according to claim 1, including means for calibrating the beam angle of said real light sources.

6. A virtual set according to claim 5, wherein said means for calibrating said beam angle is configured to measure spot intensities at a plurality of spot radii.

7. A virtual set according to claim 1, including means for calibrating intensity values of the real light sources.

8. A virtual set according to claim 7, wherein said means for calibrating intensity values are configured to compare intensities against a reference background light level in the absence of said real light source.

9. A virtual set according to claim 1, including calibrating means configured to calibrate the effect of gels.

10. A virtual set according to claim 9, wherein said means for calibrating gels includes gel attenuation calibration means configured to perform calibration procedures for each component colour.

11. A virtual set according to claim 1, wherein a plurality of real light sources are provided and each of said real light sources is co-ordinated with an associated virtual light source.

12. A virtual set according to claim 1, wherein movement of a real light source is tracked to produce control data for effecting equivalent modifications to a virtual light source.

13. A method of producing image data in a virtual set, in which real image data is combined with synthesised virtual image data, comprising:

lighting a real object by means of a real light source;

synthesising the presence of a virtual light source in said virtual image data; and co-ordinating said real light source with said virtual light source such so that said real light and said virtual light appear as originating from a substantially common light source.

14. A method according to claim 13, wherein position transducers are calibrated for said real light source.

15. A method according to claim 14, wherein said position transducers are calibrated by directing said light source at target positions on virtual set walls.

16. A method according to claim 14, wherein said position transducers are calibrated by directing said real light source at known planar surfaces in a virtual set and analysing the shape of a resulting ellipse.

17. A method according to claim 13, wherein the beam angle of said real light source is calibrated.

18. A method according to claim 17, wherein beam angle is calibrated by measuring spot intensities at a plurality of spot radii.

19. A method according to claim 13, wherein intensity values of the real light source are calibrated.

20. A method according to claim 19, wherein intensity values are compared against a reference background light level in the absence of said real light source.

21. A method according to claim 13, wherein the effect of gels are calibrated.

22. A method according to claim 21, wherein said gel attenuation calibration is performed for each component colour.

23. A method according to claim 12, wherein a plurality of real light sources are provided and each of said real light sources is co-ordinated with an associated virtual light source.

24. A method according to claim 13, wherein movement of a real light source is tracked to produce control data for effecting equivalent modifications to a virtual light source.

25. In a virtual set in which real image data is combined with synthesised virtual image data, a computer system programmed to:

generate the virtual image data including lighting effects in response to synthesised virtual light sources;

combine said virtual image data with real image data from a camera, wherein real entities are illuminated by real light sources; and to co-ordinate the position of associated real and virtual light sources so that virtual light and real light appear to be produced by the same light source.

26. A computer system according to claim 25, programmed to calibrate position transducers for said real light source.

27. A computer system according to claim 26, programmed to calibrate said position transducers in response to real light being directed at target positions on virtual set walls.

28. A computer system according to claim 26, programmed to calibrate said position transducers in response to real light being directed at known planar surfaces in a virtual set, wherein said computer system is programmed to analyse the shape of a resulting ellipse.

29. A computer system according to claim 25, programmed to calibrate the beam angle of a real light source.

30. A computer system according to claim 29, programmed to calibrate said beam angle by measuring spot intensities at a plurality of spot radii.

31. A computer system according to claim 25, programmed to calibrate intensity values of the real light source.

32. A computer system according to claim 31, programmed to calibrate said intensity values by comparing said intensity values against a reference background light level in the absence of the real light source.

33. A computer system according to claim 25, programmed to calibrate the effect of gels applied to said real light sources.

34. A computer system according to claim 33, programmed to perform said gel attenuation step with respect to each component colour.

35. A computer-readable medium having computer-readable instructions executable by a computer, such that said computer performs the steps of:

generating virtual image data including virtual lighting effects due to virtual light sources;

combining said virtual image data with real image data, wherein a real entity within a virtual set is illuminated by a real light source; and co-ordinating a virtual light source with a real light source so that real lighting and virtual lighting appear as if originating from a common light source.

36. A computer-readable medium having computer-readable instructions executable by a computer according to claim 35, such that said computer calibrates position transducers for said real light source.

37. A computer-readable medium having computer-readable instructions executable by a computer according to claim 36, such that said computer calibrates said position transducers by directing said light source at target positions on virtual set walls.

38. A computer-readable medium having computer-readable instructions executable by a computer according to claim 37, such that said computer calibrates said position transducers by directing said real light source at known planar surfaces in a virtual set and analyses the shape of a resulting ellipse.

39. A computer-readable medium having computer-readable instructions executable by a computer according to claim 36, wherein said computer calibrates the beam angle of said real light source.

40. A computer-readable medium having computer-readable instructions executable by a computer according to claim 39, wherein said computer is programmed to calibrate said beam angle by measuring spot intensities at a plurality of spot radii.

41. A computer-readable medium having computer-readable instructions executable by a computer according to claim 35, programmed to calibrate intensity values of the real light source.

42. A computer-readable medium having computer-readable instructions executable by a computer according to claim 41, wherein said computer is programmed to compare said intensity values against a reference background light level produced in the absence of said real light source.

43. A computer-readable medium having computer-readable instructions executable by a computer according to claim 35, such that said computer is programmed to calibrate the effect of gels applied to the real light sources.

44. A computer-readable medium having computer-readable instructions executable by a computer, according to claim 43, wherein said computer is programmed to perform said gel attenuation calibration with respect to each component colour.

45. A computer-readable medium having computer-readable instructions executable by a computer according to claim 35, such that said computer is programmed to co-ordinate a virtual light source with a respective real light source in a virtual set having a plurality of perceived light source.

46. A computer-readable medium having computer-readable instructions executable by a computer according to claim 35, wherein said computer is programmed to receive tracking data relating to the movement of a real light source and to control data for effecting equivalent modifications to a virtual light source.

\* \* \* \* \*

UNITED STATES PATENT AND TRADEMARK OFFICE
CERTIFICATE OF CORRECTION

PATENT NO. : 6,396,495 B1
DATED : May 28, 2002
INVENTOR(S) : Amit G. Parghi and Jean-Luc Dery It is certified that error appears in the above-identified patent and that said Letters Patent is hereby corrected as shown below:

<u>Column 13,</u>
Line 38, "12" should read -- 13 --

Signed and Sealed this

Tenth Day of June, 2003

JAMES E. ROGAN
*Director of the United States Patent and Trademark Office*